US012039913B2

(12) United States Patent
Yue et al.

(10) Patent No.: US 12,039,913 B2
(45) Date of Patent: Jul. 16, 2024

(54) PIXEL CIRCUIT, DRIVING METHOD THEREOF, AND DISPLAY PANEL

(71) Applicant: BOE TECHNOLOGY GROUP CO., LTD., Beijing (CN)

(72) Inventors: Han Yue, Beijing (CN); Xiaochuan Chen, Beijing (CN); Minghua Xuan, Beijing (CN); Can Wang, Beijing (CN); Can Zhang, Beijing (CN); Ning Cong, Beijing (CN); Ming Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 691 days.

(21) Appl. No.: 16/475,086

(22) PCT Filed: Jan. 7, 2019

(86) PCT No.: PCT/CN2019/070609

§ 371 (c)(1),
(2) Date: Jun. 29, 2019

(87) PCT Pub. No.: WO2020/007024

PCT Pub. Date: Jan. 9, 2020

(65) Prior Publication Data

US 2022/0005403 A1 Jan. 6, 2022

(30) Foreign Application Priority Data

Jul. 5, 2018 (CN) ......................... 201810730985.1

(51) Int. Cl.

| | |
|---|---|
| ***G09G 3/32*** | (2016.01) |
| ***G09G 3/20*** | (2006.01) |
| ***G09G 3/3233*** | (2016.01) |

(52) U.S. Cl.

CPC ............. *G09G 3/32* (2013.01); *G09G 3/2018* (2013.01); *G09G 3/2081* (2013.01);

(Continued)

(58) Field of Classification Search

CPC ...... G09G 3/2018; G09G 3/2081; G09G 3/32; G09G 3/3208; G09G 3/3225;

(Continued)

(56) References Cited

U.S. PATENT DOCUMENTS 5,731,802 A * 3/1998 Aras .................... G09G 3/2022 345/98
11,158,242 B2 * 10/2021 Yue .......................... G09G 3/32

(Continued)

FOREIGN PATENT DOCUMENTS

CN 1819001 A 8/2006
CN 103035188 A 4/2013

(Continued)

OTHER PUBLICATIONS

CN First Office Action in Application No. 201810730985.1, mailed on Apr. 26, 2020.

(Continued)

*Primary Examiner* — Jason M Mandeville
(74) *Attorney, Agent, or Firm* — Syncoda LLC; Feng Ma

(57) ABSTRACT

A pixel circuit includes a current control circuit, a time control circuit, and a light-emitting component, which are electrically coupled to one another in series along a common passage path of a driving current. The current control circuit is configured to control an intensity of the driving current according to a display data signal received thereby. The time control circuit is configured to control a passage time of the driving current according to a time data signal and a switch control signal received thereby. The light-emitting compo- (Continued)

nent is configured to emit a light according to the intensity and the passage time of the driving current.

15 Claims, 11 Drawing Sheets

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/0267* (2013.01); *G09G 2310/061* (2013.01); *G09G 2320/0242* (2013.01)

(58) Field of Classification Search
CPC ................ G09G 3/3233; G09G 3/325; G09G 2300/0819; G09G 2300/0852; G09G 2300/0861; G09G 2310/0267; G09G 2310/061; G09G 2320/0242
USPC ...................................................... 345/55, 76
See application file for complete search history.

(56) References Cited

U.S. PATENT DOCUMENTS

| | | | | |
|---|---|---|---|---|
| 11,315,480 | B2 * | 4/2022 | Liu | G09G 3/2022 |
| 2004/0150352 | A1 * | 8/2004 | Koide | G09G 3/3258 315/169.3 |
| 2006/0092148 | A1 * | 5/2006 | Ozawa | G09G 3/3233 345/204 |
| 2013/0083000 | A1 * | 4/2013 | Toyomura | G09G 3/3233 345/212 |

FOREIGN PATENT DOCUMENTS

| | | | |
|---|---|---|---|
| CN | 106097964 | A | 11/2016 |
| CN | 107038997 | A | 8/2017 |
| CN | 107909967 | A | 4/2018 |

OTHER PUBLICATIONS

International Search Report in Application No. PCT/CN2019/070609, mailed on Apr. 1, 2019.

* cited by examiner

PIXEL CIRCUIT, DRIVING METHOD THEREOF, AND DISPLAY PANEL

CROSS-REFERENCE TO RELATED APPLICATION

The present application claims priority to Chinese Patent Application No.

201810730985.1 filed on Jul. 5, 2018, the disclosure of which is hereby incorporated by reference in its entirety.

TECHNICAL FIELD

The present disclosure relates generally to a display technology, and more specifically to a pixel circuit, a driving method thereof, and a display panel.

BACKGROUND

Micro LED (or mLED or μLED) display devices gradually get more attentions because the size of the light-emitting diode (LED) can be reduced to only about 1% (for example, reduced to less than 100 micro meters) of a size of an existing LED, the light emitted by a micro LED is brighter, and the light-emitting efficiency is higher, and the power consumption is lower, compared with a traditional LED. Because of the above characteristics, Micro LED can be suitable for devices that have display function such as mobile phones, display devices, laptops, digital cameras and instruments and meters.

Micro LED technologies, that is, LED microminiaturization and matrix technologies, can produce micro LEDs that display a red light, a green light, and a blue light at the micrometer level over the array substrate. At present time, Micro LED technologies are substantially based on traditional GaN LED technologies, and each of the micro LEDs over the array substrate can be regarded as a separate pixel unit. In other words, they can be driven separately to emit a light. As a consequence, images with more details and higher contrast can be displayed on a Micro LED display device.

SUMMARY

In a first aspect, the present disclosure provides a pixel circuit.

The pixel circuit includes a current control circuit, a time control circuit, and a light-emitting component, which are electrically coupled to one another in series along a common passage path of a driving current. The current control circuit is configured to control an intensity of the driving current according to a display data signal received thereby. The time control circuit is configured to control a passage time of the driving current according to a time data signal and a switch control signal received thereby. The light-emitting component is configured to emit a light according to the intensity and the passage time of the driving current.

In the pixel circuit, the current control circuit, the time control circuit, and the light-emitting component can be electrically connected in series between a first voltage terminal and a second voltage terminal along the common passage path of the driving current.

According to some embodiments, the time control circuit comprises a switch circuit, a time data writing circuit and a first storage circuit. The time data writing circuit is electrically connected to a first control terminal of the switch circuit, and is configured to receive the time data signal and write the time data signal into the first control terminal of the switch circuit under control of a first scan signal. The switch circuit is configured to control whether the driving current passes through the time control circuit under control of the time data signal and the switch control signal. The first storage circuit is electrically connected to the first control terminal, and is configured to store the time data signal written by the time data writing circuit.

Herein, the switch circuit can include a first transistor, a second transistor and a third transistor. A gate electrode of the first transistor is configured as the first control terminal of the switch circuit, a first electrode of the first transistor is electrically connected to a gate electrode of the second transistor, a second electrode of the first transistor is configured to receive the switch control signal. A first electrode of the second transistor is electrically connected to the current control circuit, a second electrode of the second transistor is electrically connected to a first electrode of the third transistor. A gate electrode of the third transistor is electrically connected to the gate electrode of the first transistor, a second electrode of the third transistor is electrically connected to the light-emitting component.

The time data writing circuit can include a fourth transistor. A gate electrode of the fourth transistor is configured to receive the first scan signal. A first electrode of the fourth transistor is configured to receive the time data signal. A second electrode of the fourth transistor is electrically connected to the gate electrode of the first transistor.

The first storage circuit can include a first capacitor. A first electrode thereof is electrically connected to the gate electrode of the first transistor. A second electrode thereof is electrically connected to a third voltage terminal to receive a third voltage therefrom.

Optionally, the third voltage terminal is a ground terminal, the second voltage terminal, or a low-voltage terminal independent from the second voltage terminal.

In any embodiment of the pixel circuit described above, the current control circuit can include a driving circuit, a display data writing circuit and a second storage circuit. The driving circuit includes a second control terminal, a first terminal and a second terminal, and it is configured to control the intensity of the driving current. The display data writing circuit is electrically connected to at least one of the first terminal or the second control terminal of the driving circuit, and is configured to write the display data signal into the at least one of the first terminal or the control terminal of the driving circuit under control of a second scan signal. The second storage circuit is electrically connected to the second control terminal of the driving circuit, and is configured to store the display data signal written by the display data writing circuit.

Optionally, the display data writing circuit can be electrically connected to the first terminal of the driving circuit, and is configured to write the display data signal into the first terminal of the driving circuit under control of the second scan signal.

Furthermore, the current control circuit can further include a compensation circuit, a light-emitting control circuit and a resetting circuit. The compensation circuit is electrically connected to the second control terminal and the second terminal of the driving circuit, and is configured to compensate the driving circuit according to the second scan signal and the display data signal written into the first terminal of the driving circuit. The light-emitting control circuit is electrically connected to the first voltage terminal and the first terminal of the driving circuit, and is configured to apply a first voltage of the first voltage terminal to the first terminal of the driving circuit based on a light-emitting control signal. The resetting circuit is electrically connected to the second control terminal of the driving circuit, and is configured to apply a resetting voltage to the control terminal of the driving circuit based on a resetting signal.

According to some embodiments of the pixel circuit, the driving circuit comprises a fifth transistor. A gate electrode of the fifth transistor is configured as the second control terminal of the driving circuit. A first electrode of the fifth transistor is configured as the first terminal of the driving circuit. A second electrode of the fifth transistor is configured as the second terminal of the driving circuit and is electrically connected to the time control circuit.

According to some embodiments of the pixel circuit, the display data writing circuit comprises a sixth transistor. A gate electrode of the sixth transistor is configured to receive the second scan signal. A first electrode of the sixth transistor is configured to receive the display data signal. A second electrode of the sixth transistor is electrically connected to at least one of the first terminal or the second control terminal or the driving circuit.

According to some embodiments of the pixel circuit, the second storage circuit comprises a second capacitor. A first electrode of the second capacitor is electrically connected to the second control terminal of the driving circuit. A second electrode of the second capacitor is electrically connected to a fourth voltage terminal to receive a fourth voltage therefrom.

According to some embodiments of the pixel circuit, the compensation circuit comprises a seventh transistor. A gate electrode of the seventh transistor is configured to receive the second scan signal. A first electrode of the seventh transistor is electrically connected to the control terminal of the driving circuit. A second electrode of the seventh transistor is electrically connected to the second terminal of the driving circuit.

According to some embodiments of the pixel circuit, the light-emitting control circuit comprises an eighth transistor. A gate electrode of the eighth transistor is configured to receive the light-emitting control signal. A first electrode of the eighth transistor is electrically connected to the first voltage terminal. A second electrode of the eighth transistor is electrically connected to the first terminal of the driving circuit.

According to some embodiments of the pixel circuit, the resetting circuit comprises a ninth transistor. A gate electrode of the ninth transistor is configured to receive the resetting signal. A first electrode of the ninth transistor is electrically connected to the second control terminal of the driving circuit. A second electrode of the ninth transistor is electrically connected to a resetting voltage terminal to receive a resetting voltage therefrom.

In any embodiment of the pixel circuit described above, the light-emitting component comprises a light-emitting diode.

In a second aspect, a display panel is further provided.

The display panel includes a plurality of pixel units, and each of the plurality of pixel units comprises a pixel circuit according to any one of the embodiments of the pixel circuit described above.

In the display panel, the plurality of pixel units can be arranged in an array having rows and columns. The plurality of pixel units in a same row can be electrically connected to at least one of a same switch control line, a same first scan line, or a same second scan line. The plurality of pixel units in a same column can be electrically connected to a same time data line or a same display data line.

In a third aspect, the present disclosure further provides a method for driving a pixel circuit.

The pixel circuit comprises a current control circuit, a time control circuit, and a light-emitting component, which are electrically coupled to one another in series along a common passage path of a driving current. The current control circuit is configured to control an intensity of the driving current according to a display data signal received thereby, the time control circuit is configured to control a passage time of the driving current according to a time data signal and a switch control signal received thereby, and the light-emitting component is configured to emit a light according to the intensity and the passage time of the driving current. The method comprises the step of:

providing the display data signal to the current control circuit, and the time data signal and the switch control signal to the time control circuit.

According to some embodiments of the method, the current control circuit comprises a driving circuit, a display data writing circuit and a second storage circuit.

The driving circuit comprises a second control terminal, a first terminal and a second terminal, and is configured to control the intensity of the driving current. The display data writing circuit is electrically connected to at least one of the first terminal or the second control terminal of the driving circuit, and is configured to write the display data signal into the at least one of the first terminal or the control terminal of the driving circuit under control of a second scan signal. The second storage circuit is electrically connected to the second control terminal of the driving circuit, and is configured to store the display data signal written by the display data writing circuit.

The step of providing the display data signal to the current control circuit, and the time data signal and the switch control signal to the time control circuit comprises a display data writing stage. The display data writing stage comprises:

providing the second scan signal and the display data signal to turn on the display data writing circuit and the driving circuit, such that the display data writing circuit writes the display data signal into the driving circuit, and the second storage circuit stores the display data signal.

According to some embodiments of the method, the time control circuit comprises a switch circuit, a time data writing circuit and a first storage circuit.

The time data writing circuit is electrically connected to a first control terminal of the switch circuit, and is configured to receive the time data signal and write the time data signal into the first control terminal of the switch circuit under control of a first scan signal. The switch circuit is configured to control whether the driving current passes through the time control circuit under control of the time data signal and the switch control signal. The first storage circuit is electrically connected to the first control terminal, and is configured to store the time data signal written by the time data writing circuit.

The step of providing the display data signal to the current control circuit, and the time data signal and the switch control signal to the time control circuit comprises a time data writing stage. The time data writing stage comprises:

providing the first scan signal and the time data signal to turn on the time data writing circuit, such that the time data writing circuit writes the time data signal into the switch circuit, the first storage circuit stores the time data signal, and the switch circuit controls whether the driving current passes the time control circuit according to the time data signal and the switch control signal.

Optionally, the time data writing stage comprises a first time data writing stage, a second time data writing stage, and a third time data writing stage.

The first time data writing stage comprises: providing the first scan signal and a first time data signal to turn on the time data writing circuit, such that the time data writing circuit writes the first time data signal into the switch circuit, the first storage circuit stores the first time data signal, the switch circuit control whether the driving current passes through the time control circuit according to the first time data signal and the switch control signal, and the light-emitting component emits light according to whether the driving current is received and the intensity of the driving current.

The second time data writing stage comprises: providing the first scan signal and a second time data signal to turn on the time data writing circuit, such that the time data writing circuit writes the second time data signal into the switch circuit, the first storage circuit stores the second time data signal, the switch circuit controls whether the driving current passes through the time control circuit according to the second time data signal and the switch control signal, and the light-emitting component emits light according to whether the driving current is received and the intensity of the driving current.

The third time data writing stage comprises: providing the first scan signal and a third time data signal to turn on the time data writing circuit, such that the time data writing circuit writes the third time data signal into the switch circuit, the first storage circuit stores the third time data signal, the switch circuit control whether the driving current passes through the time control circuit in response to the third time data signal and the switch control signal, and the light-emitting component emits light according to whether the driving current is received and the intensity of the driving current.

BRIEF DESCRIPTION OF DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of the embodiments disclosed herein, the technical solutions of the embodiments of the invention will be described in a clear and fully understandable way. It is noted that the described embodiments are merely a portion but not all of the embodiments of the invention. Based on the described embodiments of the invention, those ordinarily skilled in the art can obtain other embodiment(s), which come(s) within the scope sought for protection by the invention.

The basic pixel circuit in a Micro LED display apparatus generally employs a 2T1C pixel circuit. That is, the basic function of emitting a light for the light-emitting component Micro LED is realized through two thin film transistors (TFT) and one storage capacitor Cs. The two thin film transistors include a driving transistor and a switch transistor. For example, through controlling the thin film transistors and the storage capacitor, the intensity of the electric current flowing through the Micro LED can be controlled, and as a result, the Micro LED can emit a light according to the required grayscale.

Figure 1:
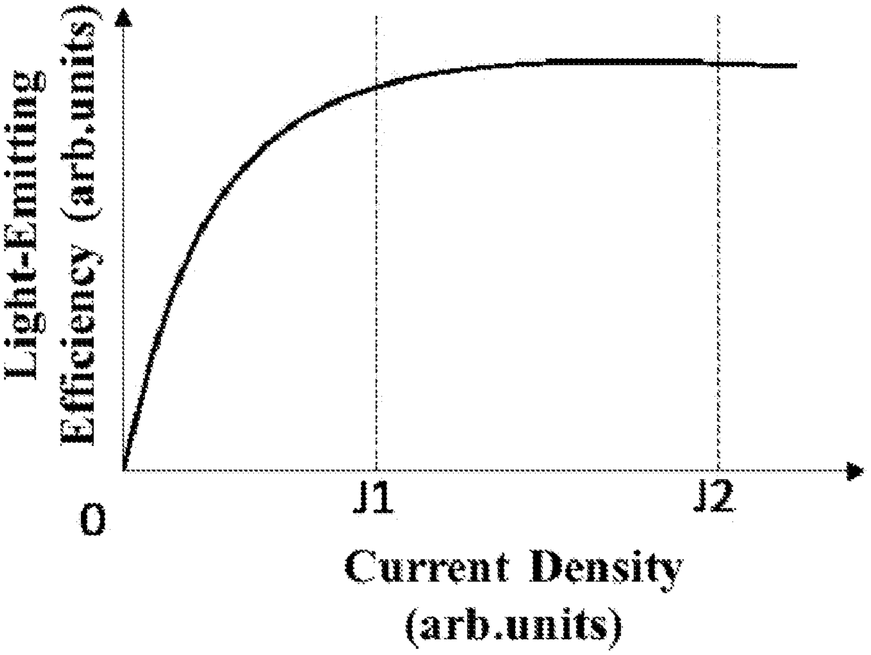
FIG. 1 is a relationship curve between the light-emitting efficiency and the current density of a Micro LED.

Micro LED is a self-luminous component, and the relationship curve between the light-emitting efficiency and the current density is illustrated in FIG. 1. As shown in FIG. 1, the light-emitting efficiency of the Micro LED changes as the current density changes: when the current density is low, the light-emitting efficiency decreases as the current density decreases. If the current density (or intensity of the current) is employed to adjust the grayscale, a low grayscale corresponds to a low current density, and a high grey scale corresponds to a high current density. Therefore, the light-emitting efficiency of the Micro LED is lower when the grayscale is lower. It is noted that in FIG. 1, each of the light-emitting efficiency (y-axis) and the current density (x-axis) utilizes arbitrary units (indicated by "arb.units") for illustrating purposes for the figure.

In addition, as the current density changes, the color coordinates of the Micro LED also change, that is, when the grayscale changes, color shift will happen to the Micro LED. If a Micro LED is working at the stable light-emitting efficiency region J1-J2 (i.e. regions with relatively high light-emitting efficiency) as shown in FIG. 1, in the case the grayscale is adjusted only via the adjustment of the current density, because the range of J1-J2 is limited, the display contrast of the display apparatus is limited. In one example, J1=0.2 A/cm$^2$ and J2=12 A/cm$^2$, then the contrast is 12/0.2=60, this contrast is difficult to satisfy the display requirements.

Herein, the display contrast is referred to as a ratio of the highest brightness level and the lowest brightness level, which can be represented by the ratio of the current corresponding to the highest brightness level and the current corresponding to the lowest brightness level.

In order to address the above issue, the present disclosure provides a pixel circuit, a driving method thereof, and a display panel.

In the pixel circuit disclosed herein, the intensity of the driving current and the duration of light emission are configured to together control the grayscale. As such, the contrast can be improved, so that the light-emitting component, such as a Micro LED, can work at the region with higher light-emitting efficiency under full grayscale. In addition, the shift of color coordinates can also be reduced.

In the following, embodiments of the present disclosure will be described in detail with reference to the figures. It should be noted, same mark in different figures refers to the same component that has already been described.

In a first aspect, the present disclosure provides a pixel circuit.

The pixel circuit comprises a current control circuit, a time control circuit, a light-emitting component, a first voltage terminal, and a second voltage terminal. The current control circuit is configured to control an intensity of a driving current flowing through the current control circuit according to a display data signal. The time control circuit is configured to receive the driving current and then to control a passage time of the driving current flowing through the time control circuit according to a time data signal and a switch control signal. The light-emitting component is configured to emit a light according to the intensity of the driving current and the passage time.

The current control circuit, the time control circuit, and the light-emitting component are electrically connected in series between the first voltage terminal and the second voltage terminal, which are employed to provide a passage path of the driving current.

Figure 2:
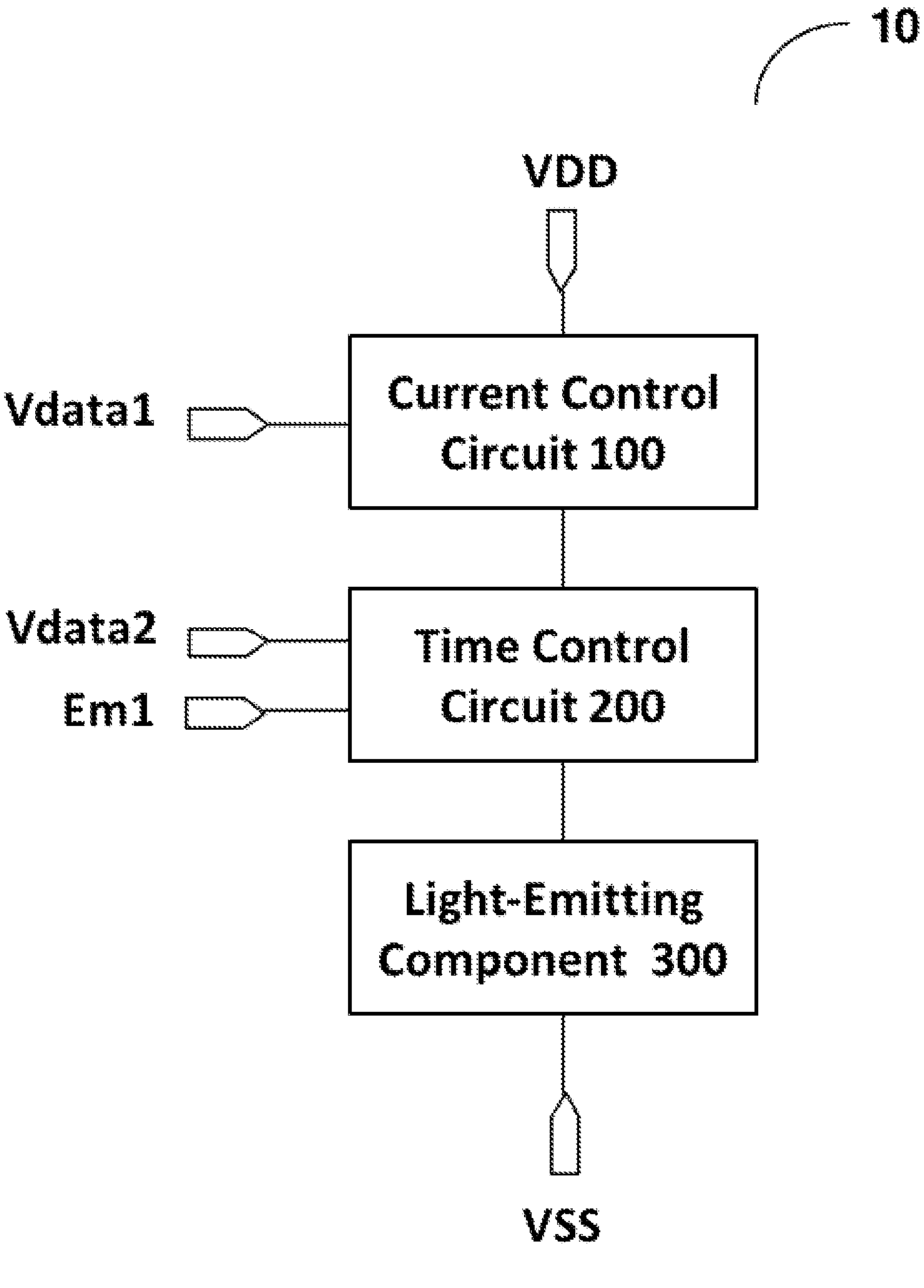
FIG. 2 is a block diagram of a pixel circuit provided by an embodiment of the present disclosure.

FIG. 2 is a block diagram of a pixel circuit provided by an embodiment of the present disclosure. With reference to FIG. 2, the pixel circuit 10 includes the first voltage terminal VDD and the second voltage terminal VSS. The current control circuit 100, the time control circuit 200, and the light-emitting component 300 are connected in series in a certain order between the first voltage terminal VDD and the second voltage terminal VSS. The pixel circuit 10 described herein, for example, can be employed for use in a sub-pixel or a pixel unit in a Micro LED display apparatus.

The current control circuit 100 is configured to control an intensity of a driving current flowing through the current control circuit 100 according to a display data signal.

In the embodiment of the pixel circuit illustrated in FIG. 2, the current control circuit 100 is electrically connected to a display data line (via a display data terminal Vdata1), the first voltage terminal VDD, and the time control circuit 200, respectively, and is configured to receive the display data signal provided by the display data terminal Vdata1, and a first voltage provided by the first voltage terminal VDD, and then to provide a driving current to the time control circuit 200. Herein, the current control circuit 100, when it is working, can provide the driving current to the light-emitting component 300 through the time control circuit 200. As a result, the light-emitting component 300 may emit light according to the intensity of the driving current.

The time control circuit 200 is configured to receive the driving current and to control a passage time of the driving current flowing through the time control circuit 200 according to a time data signal and a switch control signal.

In the embodiment of the pixel circuit illustrated in FIG. 2, the time control circuit 200 is electrically connected to a time data line (via a time data terminal Vdata2), a switch control line (via a switch control terminal Em1), the current control circuit 100, and the light-emitting component 300, respectively, and is configured to receive a time data signal provided by the time data terminal Vdata2 and a switch control signal provided by the switch control terminal Em1, and then to provide the driving current from the current control circuit 100 to the light-emitting component 300.

Herein, the time control circuit 200, when it is working, can control the passage time of the driving current. As a result, the light-emitting component 300 can receive the driving current and emit light during a corresponding period, whereas during other periods, the light-emitting component 300 does not emit light because it cannot accept the driving current. Furthermore, through coordination of the time data signal and the switch control signal, the passage time of the driving current can have multiple values, the adjustment range of the duration of light emission for the light-emitting component can thus be further increased, in turn improving the display contrast.

The light-emitting component 300 is configured to emit light according to the intensity of the driving current and the passage time.

In the embodiment of the pixel circuit illustrated in FIG. 2, the light-emitting component 300 is electrically connected to the time control circuit 200 and the second voltage terminal VSS, respectively, so that it can receive the driving current from the time control circuit 200 and the second voltage from the second voltage terminal VSS.

Herein, when the time control circuit 200 is turned on and provides the driving current from the current control circuit 100 to the light-emitting component 300, the light-emitting component 300 emits light according to the intensity of the driving current; when the time control circuit 200 is turned off, the light-emitting component 300 does not emit light. Furthermore, the light-emitting component 300 can comprise a light-emitting diode, for example, a Micro LED.

In the aforementioned working method, the light-emitting component 300 is controlled by means of the intensity of the driving current and the duration of light emission together to thereby realize a corresponding grayscale. As a result, the display contrast is improved. In addition, the light-emitting component 300 can work in regions with a higher light-emitting efficiency under full grayscale, such as the J1-J2 region as shown in FIG. 1, resulting in a reduced shift of color coordinates.

In the embodiment of the pixel circuit illustrated in FIG. 2, the current control circuit 100, the time control circuit 200 and the light-emitting component 300 are electrically connected in series between the first voltage terminal VDD and the second voltage terminal VSS, which are employed to provide a current path for the driving current. It should be noted that in the present disclosure, there are no limitations to the connection order of the current control circuit 100, the time control circuit 200 and the light-emitting component 300 between the first voltage terminal VDD and the second voltage terminal VSS, and any order for the electrical connection of the current control circuit 100, the time control circuit 200 and the light-emitting component 300 in series can be applied, as long as the current path from the first voltage terminal VDD to the second voltage terminal VSS can be provided.

In the embodiment of the pixel circuit illustrated in FIG. 2, the first voltage terminal VDD is configured to keep inputting a high-potential direct-current signal, which can be called the first voltage. The second voltage terminal VSS is configured to keep inputting a low-potential direct-current signal, which can be called the second voltage. In one example, the second voltage terminal VSS can be connected to the ground for the purpose. It is noted that the descriptions in the embodiments that follow below will be substantially the same, unless indicated otherwise, and the descriptions will not be repeated herein.

In the embodiment of the pixel circuit illustrated in FIG. 2, the display data terminal Vdata1 and the time data terminal Vdata2 can be electrically connected to a same signal line, and can be configured to respectively receive the display data signal and the time data signal at a different time, thereby the number of signal lines can be reduced. It is noted that the embodiments provided herein are not limited to this above configuration for the display data terminal Vdata1 and the time data terminal Vdata2, and the display data terminal Vdata1 and the time data terminal Vdata2 can, according to some other embodiments of the disclosure, also be electrically connected to different signal lines, so that the display data signal and the time data signal can be received simultaneously and will not interference with each other.

Figure 3:
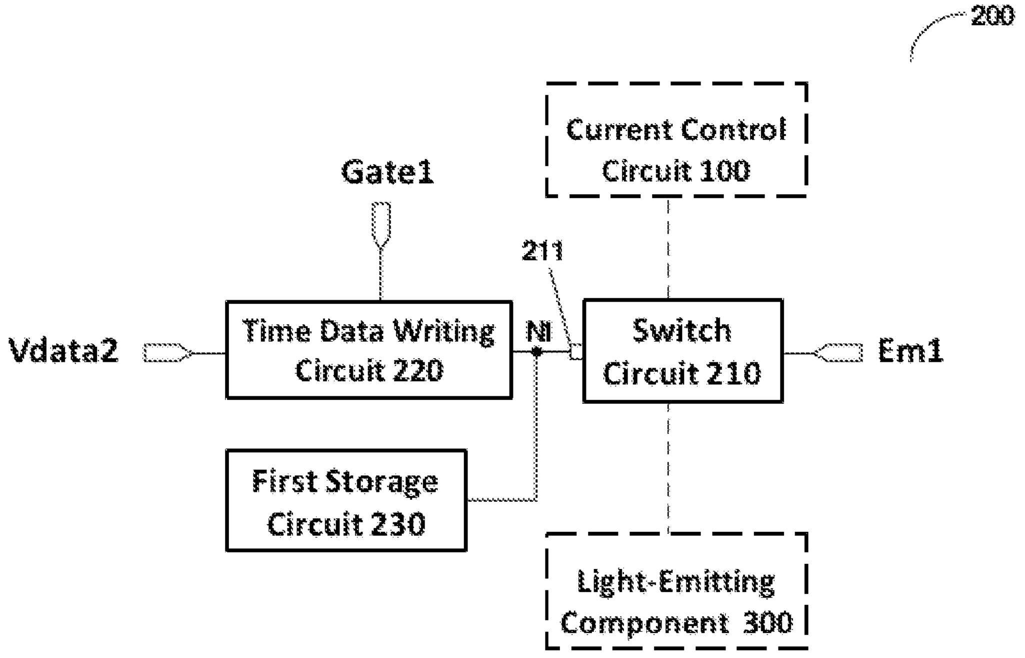
FIG. 3 is a block diagram of a time control circuit of a pixel circuit provided by an embodiment of the present disclosure.

FIG. 3 is a block diagram of a time control circuit of a pixel circuit according to an embodiment of the present disclosure. With reference to FIG. 3, the time control circuit 200 comprises a switch circuit 210, a time data writing circuit 220, and a first storage circuit 230.

The switch circuit 210 comprises a first control terminal 211, and the switch circuit 210 is configured to control whether the driving current passes through the time control circuit 200 according to the time data signal and the switch control signal.

In the embodiment of the pixel circuit illustrated in FIG. 3, the switch circuit 210 is electrically connected to a first node N1 and a switch control line (e.g. via a switch control terminal Em1) and is also electrically connected to the current control circuit 100 and the light-emitting component 300, so as to receive the time data signal that has been written into the first node N1 and the switch control signal provided by the switch control terminal Em1, and then to provide the driving current from the current control circuit 100 to the light-emitting component 300.

Herein, the switch circuit 210, when it is working, can be controlled by the time data signal and the switch control signal together to be turned on or turned off, thereby providing the driving current to the light-emitting component 300 according to the required duration of light emission.

The time data writing circuit 200 is electrically connected to the first control terminal 211 of the switch circuit 210, and is configured to write the time data signal into the first control terminal 211 of the switch circuit 210 according to a first scan signal.

In the embodiment of the pixel circuit illustrated in FIG. 3, the time data writing circuit 220 is electrically connected to the time data line (e.g. via the time data terminal Vdata2), the first node N1 and the first scan line (e.g. via a first scan terminal Gate1), respectively, so that the time data writing circuit 220 can respectively receive the time data signal provided by the time data terminal Vdata2 and the first scan signal provided by the first scan terminal Gate1.

Herein, the first scan signal from the first scan terminal Gate1 can be applied to the time data writing circuit 220 to control whether the time data writing circuit 220 is turned on or turned off. For example, the time data writing circuit 220 can be turned on according to the first scan signal, and as a result, the time data signal can be written into the first control terminal 211 (i.e. the first node N1) of the switch circuit 210, and the time data signal can be stored in the first storage circuit 230.

The first storage circuit 230 is electrically connected to the first control terminal 211 of the switch circuit 210, and the first storage circuit 230 is configured to store the time data signal written into by the time data writing circuit 220. Herein, the first storage circuit 230 is electrically connected to the first node N1, and can store the time data signal written into the first node N1 and can then control the switch circuit 210 through the time data signal that has been stored. Furthermore, the first storage circuit 230 can further be electrically connected to an additional voltage terminal (for example, the second voltage terminal VSS, another low voltage terminal, or the ground) to realize the function of voltage storage.

It should be noted that in the present disclosure, the time control circuit 200 may comprise any applicable circuits or modules, and is not limited to the aforementioned switch circuit 201, the time data writing circuit 220 and the first storage circuit 230, as long as corresponding function can be realized.

Figure 4:
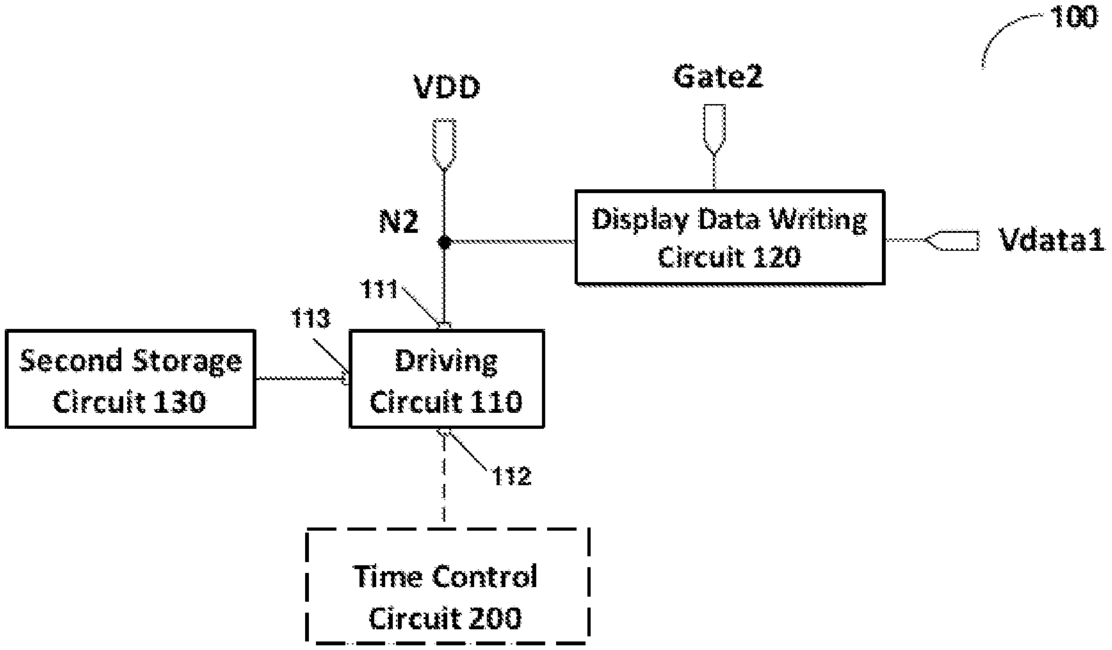
FIG. 4 is a block diagram of a current control circuit of a pixel circuit provided by one embodiment of the present disclosure.

FIG. 4 is a block diagram of a current control circuit of a pixel circuit provided by an embodiment of the present disclosure. With reference to FIG. 4, the current control circuit 100 comprises a driving circuit 110, a display data writing circuit 120 and a second storage circuit 130.

The driving circuit 110 comprises a first terminal 111, a second terminal 112, and a second control terminal 113, and the driving circuit 110 is configured to control the intensity of the driving current.

In the embodiment of the pixel circuit illustrated in FIG. 4, the second control terminal 113 of the driving circuit 110 is electrically connected to the second storage circuit 130; the first terminal 111 of the driving circuit 110 is electrically connected to the first voltage terminal VDD; and the second terminal 112 of the driving circuit 110 is electrically connected to the time control circuit 200.

Herein, the driving circuit 110 can provide the driving current to the light-emitting component 300 to thereby drive the light-emitting component 300 to emit light through the time control circuit 200 (e.g. the switch circuit 210 in the time control circuit 200), and can additionally drive the light-emitting component 300 to emit light according to the required grayscale.

The display data writing circuit 120 is electrically connected to the first terminal 111 of the driving circuit 110, and the display data writing circuit 120 is configured to write the display data signal into the first terminal 111 of the driving circuit 110 according to a second scan signal.

In the embodiment of the pixel circuit illustrated in FIG. 4, the display data writing circuit 120 is electrically connected to the display data line (e.g. via the display data terminal Vdata1), the second node N2, and the second scan line (e.g. via the second scan terminal Gate2), respectively.

Herein, the second scan signal from the second scan terminal Gate2 is applied to the display data writing circuit 120 to control whether the display data writing circuit 120 is turned on or turned off. For example, the display data writing circuit 120 can be turned on in response to the second scan signal, and the display data signal provided by the display data terminal Vdata1 can be written into the first terminal 111 (i.e. the second node N2) of the driving circuit 110. As such, the display data signal can be stored in the second storage circuit 130 through the driving circuit 110. As a result, the driving current configured to drive the light-emitting component 300 to emit light can thus be generated according to the display data signal.

It should be noted that in the embodiments of the present disclosure, there are no limitations to the specific connection and configuration of the display data writing circuit 120 and the driving circuit 110. According to another embodiment of the disclosure, the display data writing circuit 120 can be connected to the second control terminal 113 of the driving circuit 110. As a result, the display data signal can be written into the second control terminal 113 of the driving circuit 110 and be stored in the second storage circuit 130.

The second storage circuit 130 is electrically connected to the second control terminal 113 of the driving circuit 110, and the second storage circuit 130 is configured to store the display data signal that has been written into by the display data writing circuit 120.

In the embodiment of the pixel circuit illustrated in FIG. 4, the second storage circuit 130 can store the display data signal and utilize the stored display data signal to control the driving circuit 110. For example, the second storage circuit 130 can be further electrically connected to the first voltage terminal VDD or another high voltage terminal to realize voltage storage function.

Figure 5:
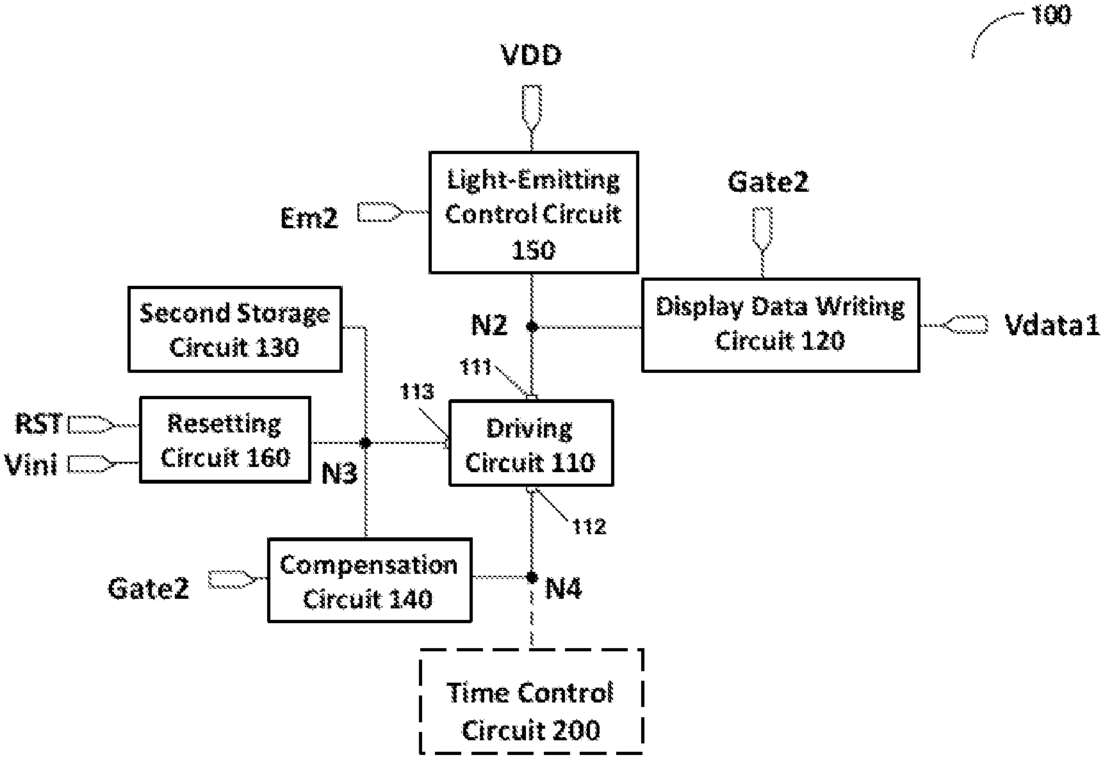
FIG. 5 is a block diagram of a current control circuit of a pixel circuit provided by yet another embodiment of the present disclosure.

FIG. 5 is a block diagram of a current control circuit of the pixel circuit provided by another embodiment of the present disclosure. With reference to FIG. 5, the current control circuit 100 further comprises a compensation circuit 140, a light-emitting control circuit 150, and a resetting circuit 160, and other structures are basically the same as the embodiment of the current control circuit 100 illustrated in FIG. 4.

The compensation circuit 140 is electrically connected to the second control terminal 113 and the second terminal 112 of the driving circuit 110, and the compensation circuit 140 is configured to compensate the driving circuit 110 according to the second scan signal and the display data signal written into the first terminal 111 of the driving circuit 110.

In the embodiment of the pixel circuit illustrated in FIG. 5, the compensation circuit 140 is electrically connected to the second scan line (e.g. via the second scan terminal Gate2), the third node N3 and the fourth node N4, respectively.

Herein, the second scan signal from the second scan terminal Gate2 is applied to the compensation circuit 140 to control whether it is turned on or turned off. For example, the compensation circuit 140 can be turned on in response to the second scan signal, thereby electrically connecting the second control terminal 113 (i.e. the third node N3) and the second terminal 112 (i.e. the fourth node N4) of the driving circuit 110, so that the information related to the threshold voltage of the driving circuit 110 (i.e. threshold voltage information) and the display data signal written into by the display data writing circuit 120 are both stored in the second storage circuit 130. Therefore, the stored display data signal and voltage value comprising the threshold voltage information can be used to control the driving circuit 110, so that the output of the driving circuit 110 can be compensated.

The light-emitting control circuit 150 is electrically connected to the first terminal 111 of the driving circuit 110, and the light-emitting control circuit 150 is configured to apply the first voltage of the first voltage terminal VDD to the first terminal 111 of the driving circuit 110 according to the light-emitting control signal.

In the embodiment of the pixel circuit illustrated in FIG. 5, the light-emitting control circuit 150 is electrically connected to the light-emitting control line (i.e. via the light-emitting control terminal Em2), the first voltage terminal VDD, and the second node N2, respectively.

Herein, the light-emitting control circuit 150 can be turned on in response to the light-emitting control signal provided by the light-emitting control terminal Em2. Therefore, the first voltage can be applied to the first terminal 111 (i.e. the second node N2) of the driving circuit 110. In a case in which the driving circuit 110 and the time control circuit 200 are both turned on, the driving circuit 110 applies this first voltage to the light-emitting component 300 to provide a driving voltage though the time control circuit 200, thereby driving the light-emitting component 300 to emit light.

The resetting circuit 160 is electrically connected to the second control terminal 113 of the driving circuit 110, and the resetting circuit 160 is configured to apply a resetting voltage to the second control terminal 113 of the driving circuit 110 according to a resetting signal.

In the embodiment of the pixel circuit illustrated in FIG. 5, the resetting circuit 160 is electrically connected to the third node N3, the resetting voltage terminal Vini, and the resetting signal line (e.g. via a resetting signal terminal RST), respectively.

Herein, the resetting circuit 160 can be turned on in response to the resetting signal provided by the resetting signal terminal RST, and the resetting voltage provided by the resetting voltage terminal Vini is applied to the second control terminal 113 (i.e. the third node N3) of the driving circuit 110, thereby a resetting operation can be conducted to the resetting circuit 110 and the second storage circuit 130. In turn, the influence of the previous light-emitting stage is eliminated.

In addition, the resetting voltage applied by the resetting circuit 160 can also be stored in the second storage circuit 130, and as a result, the driving circuit 110 can be kept being turned on. As such, when the display data signal is written the next time, it facilitates the display data signal to be written into the second storage circuit 130 through the driving circuit 110 and the compensation circuit 140.

Herein, the resetting voltage terminal Vini can be electrically connected to the second voltage terminal VSS, and the second voltage can be regarded therefore as a resetting voltage. Alternatively, the resetting voltage terminal Vini can also be a low voltage terminal that is independent from the second voltage terminal VSS. There are no limitations herein. According to some other embodiments of the disclosure, the resetting circuit may also be integrated into other circuits or it may be omitted.

Figure 6:
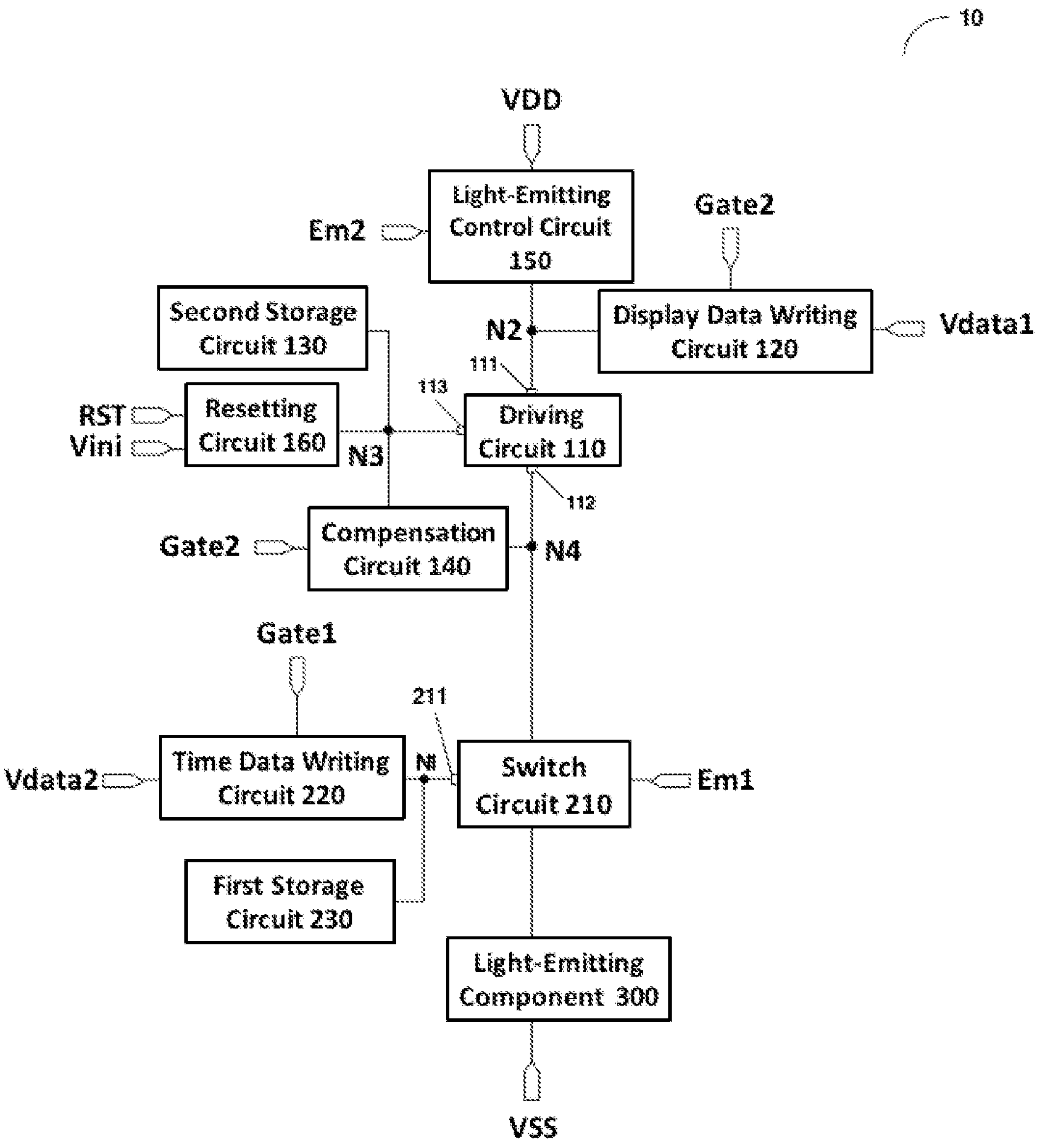
FIG. 6 is a block diagram of a pixel circuit provided by yet another embodiment of the present disclosure.

FIG. 6 is a block diagram of a pixel circuit provided by yet another embodiment of the present disclosure. With reference to FIG. 6, the current control circuit 100 of the pixel circuit 10 is basically the same as the current control circuit 100 in the embodiment illustrated in FIG. 5, and the time control circuit 200 of the pixel circuit 10 is basically the same as the time control circuit 200 in the embodiment illustrated in FIG. 3. The specific connection relationship and relevant description of the pixel circuit 10 can reference to the relevant content for the above embodiments, and it will not be repeated herein.

It should be noted that the pixel circuit 10 provided by the embodiments of the present disclosure may also comprise other circuit structures, such as circuit structures that have other compensation functions, and the compensation function can be realized through voltage compensation, current compensation or mixed compensation. There are no limitations herein.

It should be further noted that in embodiments of the present disclosure, the pixel circuit 10 can be substantially a combination of the time control circuit 200 and another pixel circuit of any structure that have the function to control the intensity of the driving current, and thus it is not limited to the aforementioned structures, as long as the pixel circuit 10 provided by embodiments of the present disclosure can control the grayscale through both the intensity of the current and the duration of light emission.

Regardless of the different configurations and structures thereof, the pixel circuit 10 can improve contrast, and the light-emitting component 300 (such as Micro LED) can work at regions with a higher light-emitting efficiency under full grayscale, and the color coordinate shift can be reduced.

Figure 7:
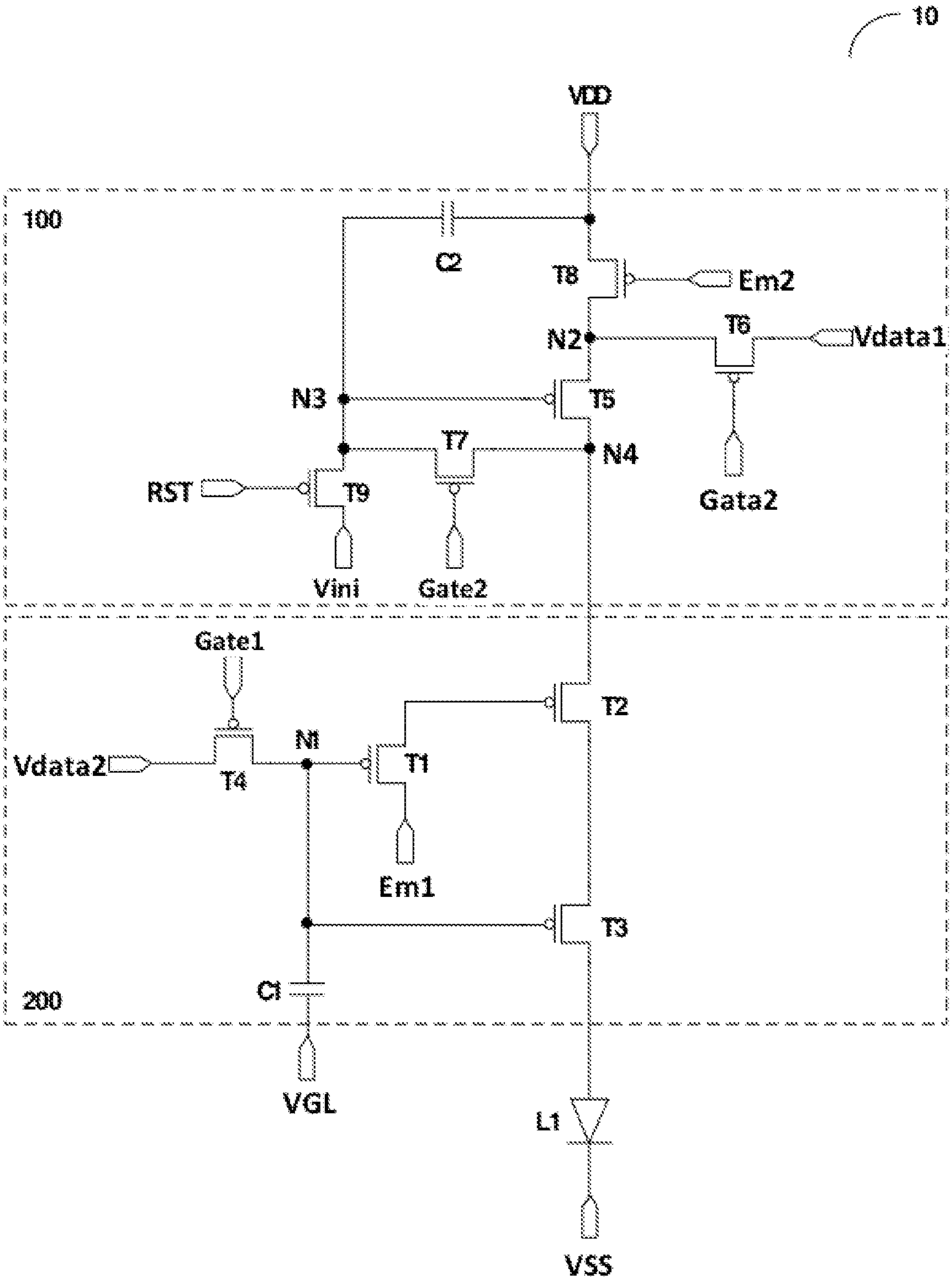
FIG. 7 is a circuit diagram of the pixel circuit illustrated in FIG. 6 according to some embodiments of the disclosure.

FIG. 7 is a circuit diagram of the pixel circuit illustrated in FIG. 6 according to some embodiments of the disclosure. With reference to FIG. 7, the pixel circuit 10 comprises nine transistors: T1, T2, T3, T4, T5, T6, T7, T8 and T9, a first capacitor C1, a second capacitor C2, and a light-emitting component L1. In the embodiment of the pixel circuit illustrated in FIG. 7, the fifth transistor T5 is employed as a driving transistor, whereas other transistors are employed as switch transistors. The light-emitting component L1 can be any type of a Micro LED, which can emit a red light, a green light, a blue light or a white light, and so on, and there are no limitations herein.

In the embodiment of the pixel circuit 10 described herein, the time control circuit 200 substantially comprises the switch circuit 210, the time data writing circuit 220 and the first storage circuit 230, as illustrated in FIG. 6.

With reference to both FIG. 6 and FIG. 7, the switch circuit 210 substantially includes the first transistor T1, the second transistor T2 and the third transistor T3. A gate electrode of the first transistor T1 is configured as the first control terminal 211 of the switch circuit 201 shown in FIG. 6, which is electrically connected to the first node N1. A first electrode of the first transistor T1 is electrically connected to a gate electrode of the second transistor T2. A second electrode of the first transistor T1 is electrically connected to the switch control line (via the switch control terminal Em1) to thereby receive the switch control signal therefrom.

A first electrode of the second transistor T2 is electrically connected to the current control circuit 100, a second electrode of the second transistor T2 is electrically connected to a first electrode of the third transistor T3. A gate electrode of the third transistor T3 is electrically connected to the gate electrode of the first transistor T1. A second electrode of the third transistor T3 is electrically connected to the light-emitting component L1 (for example, electrically connected to the anode of the light-emitting component L1).

The time data writing circuit 220 substantially includes the fourth transistor T4. A gate electrode of the fourth transistor T4 is electrically connected to the first scan line (via the first scan terminal Gate1) to thereby receive the first scan signal therefrom. A first electrode of the fourth transistor T4 is electrically connected to the time data line (via the time data terminal Vdata2) to thereby receive the time data signal therefrom. A second electrode of the fourth transistor T4 is electrically connected to the gate electrode of the first transistor T1.

The first storage circuit 230 substantially includes the first capacitor C1. A first electrode of the first capacitor C1 is electrically connected to the gate electrode of the first transistor T1. A second electrode of the first capacitor C1 is electrically connected to the third voltage terminal VGL to thereby receive the third voltage therefrom. Herein, the third voltage terminal VGL can be configured to keep inputting a low-potential direct-current signal (e.g. by connecting to the ground), which is termed the third voltage herein the in the embodiments that follow. According to some embodiments, the third voltage terminal VGL is electrically connected to the second voltage terminal VSS, and the second voltage as such will be regarded as the third voltage. According to some other embodiments, the third voltage terminal VGL is a low-voltage terminal that is independent from the second voltage terminal VSS. There are no limitations herein.

It should be noted that the present disclosure is not limited to the above described embodiments, and the time control circuit 200 is not limited to only comprising the switch circuit 210, the time data writing circuit 220 and the first storage circuit 230. In addition, each of the switch circuit 210, the time data writing circuit 220 and the first storage circuit 230 is not limited to the aforementioned implementation illustrated in FIG. 7, and can include other components.

Further in the embodiment of the pixel circuit 10 described herein, the current control circuit 100 comprises the driving circuit 110, the display data writing circuit 120, the second storage circuit 130, the compensation circuit 140, the light-emitting control circuit 150 and the resetting circuit 160, as shown in FIG. 6.

The driving circuit 110 substantially includes the fifth transistor T5. A gate electrode of the fifth transistor T5 is configured as the second control terminal 113 of the driving circuit 110 and is electrically connected to the third node N3. A first electrode of the fifth transistor T5 is configured as the first terminal 111 of the driving circuit 110 and is electrically connected to the second node N2. A second electrode of the fifth transistor T5 is configured as the second terminal 112 of the driving circuit 110 and is electrically connected to the fourth node N4, and is further electrically connected to the time control circuit 200 (i.e. electrically connected to the first electrode of the second transistor T2).

It should be noted that the present disclosure is not limited to the configuration described above and illustrated in FIG. 7, and the driving circuit 110 can comprise other components. In one illustrating example, the driving circuit 110 can comprise two groups of driving transistors, which are configured to be switched according to specific situations.

Further in the embodiment of the pixel circuit 10 described herein, the display data writing circuit 120 substantially includes the sixth transistor T6. A gate electrode of the sixth transistor T6 is electrically connected to the second scan line (via the second scan terminal Gate2) to thereby receive the second scan signal therefrom. A first electrode of the sixth transistor T6 is electrically connected to the display data line (via the display data terminal Vdata1) to thereby receive the display data signal therefrom. A second electrode of the sixth transistor T6 is electrically connected to the first terminal 111 of the driving circuit 110 (i.e. the first electrode of the fifth transistor T5).

It should be noted that in the present disclosure, there are no limitations to the connection relationship of the sixth transistor T6 and the fifth transistor T5. In one illustrating and non-limiting example, the compensation circuit 140 is not included in the current control circuit 100, and the second electrode of the sixth transistor T6 can be electrically connected to the gate electrode of the fifth transistor T5, so that the display data signal can be written into the gate electrode of the fifth transistor T5. The display data writing circuit 120 can comprise other components as well, and there are no limitations herein.

Further in the embodiment of the pixel circuit 10 described herein, the second storage circuit 130 substantially comprises the second capacitor C2. A first electrode of the second capacitor C2 is electrically connected to the second control terminal 113 of the driving circuit 110 (i.e. the third node N3). A second electrode of the second capacitor C2 is electrically connected to a fourth voltage terminal to thereby receive a fourth voltage therefrom. In this embodiment described herein, the first voltage terminal VDD is employed as the fourth voltage terminal, so that the first voltage can be provided to the second electrode of the second capacitor C2 as the fourth voltage. As a result, the number of signal lines can be reduced.

It is noted that the present disclosure is not limited to the embodiment described above. According to another embodiment, the fourth voltage terminal is another high-voltage terminal that is independent from the first voltage terminal VDD. Through this approach, the accuracy of the display data signal stored into the second capacitor C2 can be improved. It should be further noted that the present disclosure is not limited to this above embodiment, and the second storage capacitor 130 can comprise other components as well. According to one other embodiment, the second storage circuit 130 comprises two capacitors which are electrically connected in parallel or in series.

Further in the embodiment of the pixel circuit 10 described herein, the compensation circuit 140 substantially comprises the seventh transistor T7. A gate electrode of the seventh transistor T7 is electrically connected to the second scan line (via the second scan terminal Gate2) to thereby receive the second scan signal therefrom. A first electrode of the seventh transistor T7 is electrically connected to the second control terminal 113 (i.e. the third node N3) of the driving circuit 110. A second electrode of the seventh transistor T7 is electrically connected to the second terminal 112 (i.e. the fourth node N4) of the driving circuit 110. It should be noted that the present disclosure is not limited to this above configuration, and the compensation circuit 140 can comprise other components.

Further in the embodiment of the pixel circuit 10 described herein, the light-emitting control circuit 150 substantially comprises the eighth transistor T8. A gate electrode of the eighth transistor T8 is electrically connected to the light-emitting control terminal Em2 to thereby receive the light-emitting control signal therefrom. A first electrode of the eighth transistor T8 is electrically connected to the first voltage terminal VDD. A second electrode of the eighth transistor T8 is electrically connected to the first terminal 111 of the driving circuit 110 (i.e. the second node N2). It should be noted that the present disclosure is not limited to this above configuration, and the light-emitting control circuit 150 can comprise other components.

Further in the embodiment of the pixel circuit 10 described herein, the resetting circuit 160 substantially comprises the ninth transistor T9. A gate electrode of the ninth transistor T9 is electrically connected to the resetting signal line (via the resetting signal terminal RST) to thereby receive the resetting signal therefrom. A first electrode of the ninth transistor T9 is electrically connected to the second control terminal 113 of the driving circuit 110 (i.e. the third node N3). A second electrode of the ninth transistor T9 is electrically connected to the resetting voltage terminal *Vini* to thereby receive the resetting voltage therefrom. It should be noted that the present disclosure is not limited to this above configuration, and the resetting circuit 160 can comprise other components.

Further in the embodiment of the pixel circuit 10 described herein, the light-emitting component 300 substantially comprise the light-emitting component L1 (e.g., Micro LED). A first terminal of the light-emitting component L1 (e.g. an anode as illustrated in FIG. 7) is electrically connected to the second electrode of the third transistor T3. A second terminal of the light-emitting component L1 (e.g. cathode here) is electrically connected to the second voltage terminal VSS to thereby receive the second voltage therefrom. According to some embodiments, such as in a display panel, a plurality of pixel circuits 10 are arranged in an array, and the cathodes of the light-emitting components L1 in each of the plurality of pixel circuits 10 can be electrically connected to a same second voltage terminal, to thereby have a shared cathode.

In this above embodiment illustrated in FIG. 7, the eighth transistor T8, the fifth transistor T5, the second transistor T2, the third transistor T3 and the light-emitting component L1 are electrically connected in series between the first voltage terminal VDD and the second voltage terminal VSS to thereby substantially provide the current path for the driving current, and as a result, the light-emitting component L1 can emit light under the driving of the driving current.

It should be noted that in the embodiments of the present disclosure, the order of connection of the eighth transistor T8, the fifth transistor T5, the second transistor T, the third transistor T3 and the light-emitting component L1 is not limited to what is shown in FIG. 7, and can optionally be any type of suitable connection in series, as long as the current path of the driving current can be provided thereby.

Figure 8:
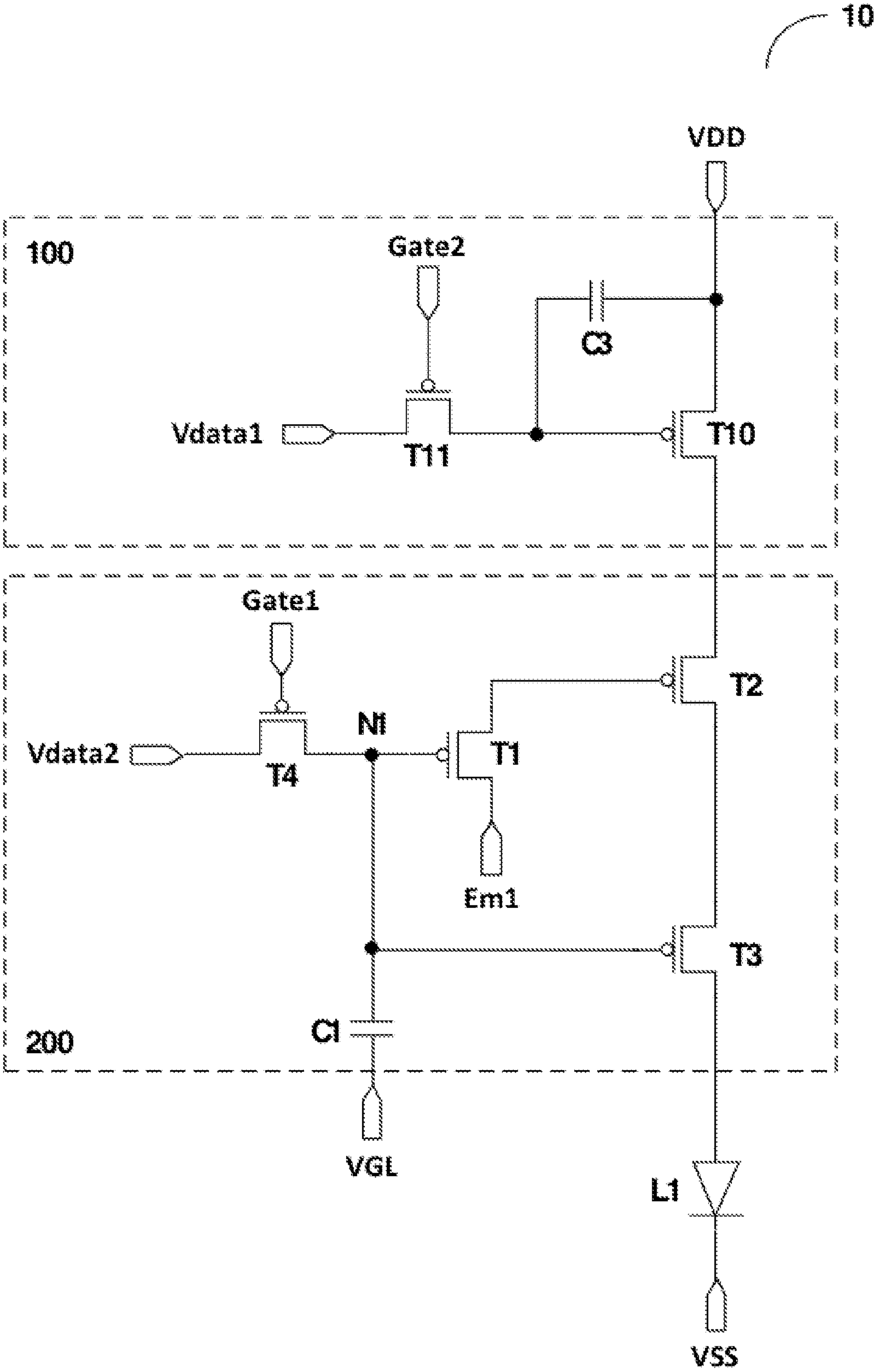
FIG. 8 is a circuit diagram of the pixel circuit illustrated in FIG. 2 according to some embodiments of the disclosure.

FIG. 8 is a circuit diagram of the pixel circuit illustrated in FIG. 2 according to some embodiments of the disclosure. With reference to both FIG. 2 and FIG. 8, the pixel circuit 10 substantially comprises the first transistor T1, the second transistor T2, the third transistor T3, the fourth transistor T4, the tenth transistor T10, the eleventh transistor T11, the first capacitor C1, the third capacitor C3 and the light-emitting component L1.

In the embodiment of the pixel circuit 10 described herein and illustrated in FIG. 8, the time control circuit 200, and the light-emitting component 300, as well as the detailed connection and configuration for the first transistor T1, the second transistor T2, the third transistor T3, the fourth transistor T4, and the first capacitor C1, is substantially same as the time control circuit 200 in the pixel circuit 10 in the embodiment described above and illustrated in FIG. 7, and the description thereof will not be repeated herein.

In this embodiment illustrated in FIG. 8, the current control circuit 100 only comprises a driving circuit 110, a display data writing circuit 120, and a second storage circuit 130, and the current control circuit 100 can be implemented as basic 2T1C circuit.

In the embodiment of the pixel circuit 10 illustrated in FIG. 8, the driving circuit 110 substantially comprises a tenth transistor T10. A gate electrode of the tenth transistor T10 is electrically connected to the display data writing circuit 120. A first electrode of the tenth transistor T10 is electrically connected to the first voltage terminal VDD. A second electrode of the tenth transistor T10 is electrically connected to the first electrode of the second transistor T2.

Further in the embodiment of the pixel circuit 10 illustrated in FIG. 8, the display data writing circuit 120 substantially comprises a eleventh transistor T11. A gate electrode of the eleventh transistor T11 is electrically connected to the second scan line (via the second scan terminal Gate2) to thereby receive the second scan signal therefrom. A first electrode of the eleventh transistor T11 is electrically connected to the display data line (via the display data terminal Vdata1) to thereby receive the display data signal therefrom. A second electrode of the eleventh transistor T11 is electrically connected to the gate electrode of the tenth transistor T10.

Further in the embodiment of the pixel circuit 10 illustrated in FIG. 8, the second storage circuit 130 substantially comprises a third capacitor C3. A first electrode of the third capacitor C3 is electrically connected to the gate electrode of the tenth transistor T10. A second electrode of the third capacitor C3 is electrically connected to the first voltage terminal VDD.

It should be noted that in the embodiments of the present disclosure, the current control circuit 100 and the light-emitting component 300 in the pixel circuit 10 can be implemented in a pixel circuit of any normal structures, for example, 2T1C, 4T1C, 4T2C and so on. Accordingly, the order of connection in series between the transistors that provide the current path for the driving current in the time control circuit 200 (e.g. the second transistor T2 and the third transistor T3) and the driving transistor and light-emitting component in the above circuits such as 2T1C, 4T1C and 4T2C circuits can vary and is not limited to the embodiments described above. In two illustrating and non-limiting examples, the tenth transistor T10 can be electrically connected in series between the second transistor T2 and third transistor T3 according to some embodiments of the pixel circuit 10, or can be electrically connected in series between the third transistor T3 and the light-emitting component L1 according to some other embodiments.

It should be noted that in the above descriptions of the embodiments of the present disclosure, the first node N1, the second node N2, the third node N3 and the fourth node N4 are referred to as convergence points of electrical connections in the circuit diagrams, and may not represent actual components.

It should be further noted that the transistors in any of the embodiments described above can all be thin film transistors, a field effect transistors, or other switch components that have similar characteristics, and thin film transistors are used as illustrating yet non-limiting examples in the embodiments of the present disclosure. The source electrode and the drain electrode in each of the transistors herein may be symmetrical in structure, so the structure of the source electrode and drain electrode may be indistinguishable. In embodiments of the present disclosure, in order to distinguish the two electrodes which are not the gate electrode, one electrode is described as the first electrode, the other electrode is described as the second electrode.

In addition, the transistors in embodiments of the present disclosure are all described with the example of P-type transistors, and as such, the first electrode of the transistor is the source electrode, the second electrode as the drain electrode. There are no limitations herein.

According to some other embodiments, one or more transistors in the pixel circuit 10 according to embodiments of the present disclosure may also be N-type transistors. As such, the first electrode of the transistor is the drain electrode, and the second electrode is the source electrode. It is acceptable as long as electrodes of the transistors of selected type are with reference to the examples in the present disclosure and the corresponding voltage terminals and signal terminals are configured to provide corresponding high-potential signals or low-potential signals with reference to the examples in the present disclosure.

Furthermore, when N-type transistors are adopted, the Indium Gallium Zinc Oxide (IGZO) can preferably be used as the active layer of the thin film transistor. Compared with embodiments of the thin-film transistors where the low-temperature poly silicon (LTPS) or the amorphous silicon (e.g. hydrogenated amorphous silicon) is used as the active layer of thin film transistor, the size of the transistor can be effectively reduced and the issue of current drain can be prevented.

When P-type transistors are adopted, the low-temperature poly silicon (LTPS) or amorphous silicon (e.g. hydrogenated amorphous silicon) can be adopted as the active layer of the thin film transistor.

Figure 9:
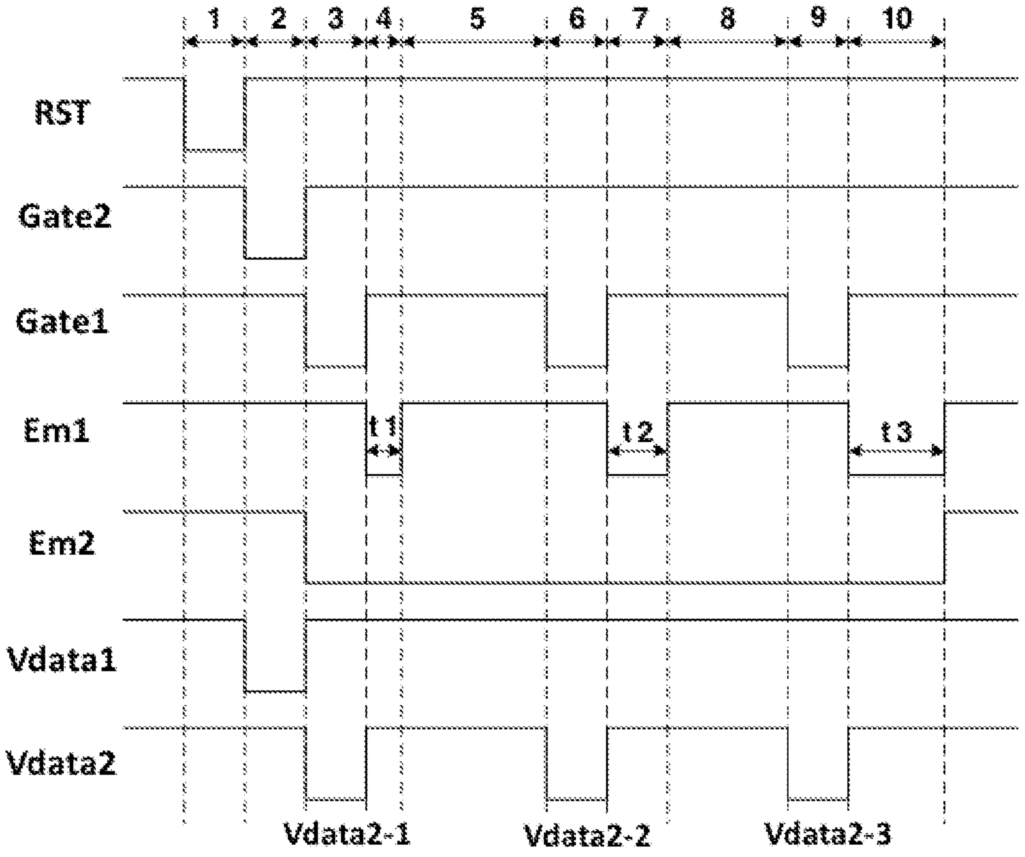
FIG. 9 illustrates a signal time-sequence diagram of a pixel circuit provided by one embodiment of the present disclosure.

FIG. 9 illustrates a signal time-sequence diagram of a pixel circuit provided by one embodiment of the present disclosure. In the following, with reference to the signal time-sequence diagram of FIG. 9, the working principles of the pixel circuit 10 in FIG. 7 will be described. In addition, in the description, an N-type transistor is employed as an example for each of the transistors, i.e., the transistor is turned on when the gate electrode of each transistor receives a low-potential signal, and is turned off when the gate electrode of each transistor receives a high-potential signal. There are however, no limitations herein.

In the figure and the following descriptions, each of RST, Gate1, Gate2, Em1, Em2, Vdata1, Vdata2, and so on, is not only referred to as a corresponding signal terminal, but also referred to as the corresponding signal provided thereon.

During the first stage through the tenth stage S1-S10 (i.e. the numerals 1-10 shown in FIG. 9), the pixel circuit can respectively conduct the following operations.

During the first stage S1, the resetting signal terminal RTS provides a low-potential signal, the ninth transistor is turned on; a low-potential signal (not shown in figures) provided by the resetting voltage terminal *Vini* is inputted into the third node N3. The gate electrode the fifth transistor T5 and the second capacitor C2 is reset by the low-potential signal at the third node N3. In addition, the fifth transistor T5 is turned on under the low-potential signal at the third node N3 and is sustained to the next stage so that the display data signal can be written during the next stage.

During the second stage S2, each of the second scan terminal gate2 and the display data terminal Vdata1 provides a low-potential signal, and the sixth transistor T6 and the seventh transistor T7 are both turned on. The fifth transistor T5 is kept on. Therefore, the display data signal provided by the display data terminal Vdata1 charges the third node N3 (i.e. charges the second capacitor C2) through the path formed by the sixth transistor T6, the fifth transistor T5 and the seventh transistor T7. It should be understood that the electric potential at the second node N2 is kept at Vdata1, and meanwhile according to the characteristics of the fifth transistor T5, when the electric potential at the third node N3 is changed to Vdata1+Vth, the fifth transistor T5 is turned off, to thereby complete the charging process.

Herein, Vth is referred to as the threshold voltage of the fifth transistor T5, since the fifth transistor T5 is a P-type transistor as described in this embodiment, the threshold voltage Vth may be a negative value. Because the electric potential at the third node N3 is Vdata1+Vth, the relevant information including the display data signal Vdata1 and the threshold voltage Vth is stored in the second capacitor C2, which can provide the display data and can compensate the threshold voltage Vth of the fifth transistor T5 during the subsequent light-emitting stage.

During the third stage S3, the light-emitting control terminal Em2 provides a low-potential signal, and the eighth transistor T8 is turned on. Because the electric potential at the third node N3 is Vdata1+Vth at this moment and the electric potential at the second node N2 is VDD, therefore the fifth transistor T5 is turned on. Each of the first scan terminal gate1 and the time data terminal Vdata2 provides a low-potential signal, and the fourth transistor T4 is turned on, then the time data signal provided by the time data terminal Vdata2 is written into the first node N1 and is stored by the first capacitor C1. The first transistor T1 and the third transistor T3 are turned on under the influence of the low electric potential at the first node N1. The switch control signal provided by the switch control terminal Em1 is written into the gate electrode of the second transistor T2.

At this time, the switch control terminal Em1 provides a high-potential signal, therefore the second transistor T2 is turned off. The light-emitting component L1 does not emit light at this stage. It should be noted that according to yet another embodiment, the time data terminal Vdata2 also provides a high-potential signal at this time, and as a result, the first transistor T1 and the third transistor T3 are accordingly turned off.

During the fourth stage S4, the light-emitting control terminal Em2 continues to provide the low-potential signal, and the eighth transistor T8 is kept being on. The fifth transistor T5 and the third transistor T3 are kept on. The switch control terminal Em1 provides a low-potential signal, and the second transistor T2 is turned on. The first voltage terminal VDD, the eighth transistor T8, the fifth transistor T5, the second transistor T2, the third transistor T3, the light-emitting component L1 and the second voltage terminal VSS together form a current path, so that the light-emitting component L1 is driven by the driving current to thereby emit lights.

At this time, the intensity of the driving current is determined according to the display data signal Vdata1 that has been written during the second stage S2, and whether to emit light is determined by the time data signal Vdata2 that has been written during the third stage S3, and the duration of light emission is equal to the effective pulse width t1 of the switch control signal Em1 during this stage.

It should be noted that according to yet another embodiment, if the time data terminal Vdata2 provides a high-potential signal during the third stage S3, both the first transistor T1 and the third transistor T3 are kept off, and the light-emitting component L1 does not emit light during this stage. In addition, when the first transistor T1 is turned off, the gate electrode of the second transistor T2 is in a floating state, and as a result, the state of the second transistor T2 cannot be controlled. At this time, the third transistor T3 is also turned off to thereby ensure that the current path for the driving current is disconnected, so that the light-emitting component L1 does not emit light.

Herein, the value of the driving current $I_{L1}$ flowing through the light-emitting component L1 can be obtained through the following formula:

$$
\begin{aligned}
I_{L1} &= K(V_{GS} - Vth)^2 \\
&= K[(Vdata1 + Vth - VDD) - Vth]^2 \\
&= K(Vdata1 - VDD)^2
\end{aligned}
$$

In the above formula, Vth is referred to as the threshold value of the fifth transistor T5, $V_{GS}$ is referred to as the voltage between the gate electrode and the source electrode (i.e. the first electrode here) of the fifth transistor T5, K is a constant related to the fifth transistor T5 itself.

From the above formula, it can be seen that the driving current $I_{L1}$ flowing through the light-emitting component L1 is no longer related to the threshold voltage Vth of the fifth transistor T5. As a result, the compensation to the pixel circuit 10 can be realized, and the problem of threshold voltage drift of the driving transistor (e.g. the fifth transistor) caused by long time operation and manufacturing process is solved, its influence to the driving current $I_{L1}$ is eliminated, therefore the display effect of the display apparatus adopting the pixel circuit 10 is improved.

During the fifth stage S5, the switch control terminal Em1 provides a high-potential signal, and the second transistor T2 is turned off. As such, the current path for the driving current is disconnected, and the light-emitting component L1 does not emit light.

During the sixth stage S6, the light-emitting control terminal Em2 continues to provide a low-potential signal, and the eighth transistor T8 is turned on. The fifth transistor T5 is also turned on. Each of the first scan terminal Gate 1 and the time data terminal Vdata2 provides a low-potential signal, the fourth transistor T4 is turned on, and the time data signal provided by the time data terminal Vdata2 is written into the first node N1 and stored by the first capacitor C1.

The first transistor T1 and the third transistor T3 are both turned on under the influence of the low potential at the first node N1. The switch control signal provided by the switch control terminal Em1 is written into the gate electrode of the second transistor T2. At this time, the switch control terminal Em1 provides a high-potential signal, therefore the second transistor T2 is turned off. The light-emitting component L1 does not emit light during this stage. It should be noted that in another embodiment, the time data terminal Vdata2 can also provide a high-potential signal at this time, and as a result, the first transistor T1 and the third transistor T3 are accordingly turned off.

During the seventh stage S7, the light-emitting control terminal Em2 continues to provide a low-potential signal, and the eighth transistor T8 is turned on. The fifth transistor T5 and the third transistor T3 are both turned on. The switch control terminal Em1 provides a low-potential signal, and the second transistor T2 is turned on. The light-emitting component L1 is driven by the driving current to emit light.

At this time, the intensity of the driving current is determined by the display data signal Vdata1 that has been written into during the second stage S2, and whether to emit light is determined by the time data signal Vdata1 that has been written into during the sixth stage S6, and the duration of light emission is equal to the effective pulse width t2 of the switch control signal Em1 during this stage.

It should be noted that in another embodiment, during the sixth stage S6, if the time data terminal Vdata2 provides a high-potential signal, the first transistor T1 and the third transistor T3 are both kept off, and the light-emitting component L1 does not emit light at this stage.

During the eighth stage S8, the switch control terminal Em1 provides a high-potential signal, and the second transistor T2 is turned off Therefore, the current path for the driving current is disconnected, and the light-emitting component L1 does not emit light.

During the ninth stage S9, the light-emitting control terminal Em2 continues to provide a low-potential signal, and the eighth transistor T8 is kept on. The fifth transistor T5 is also kept on. Each of the first scan terminal Gate1 and the time data terminal Vdata2 provides a low-potential signal, the fourth transistor T4 is turned on, and the time data signal provided by the time data terminal Vdata2 is written into the first node N1 and stored by the first capacitor C1. Both the first transistor T1 and the third transistor T3 are turned on under the low-potential signal at the first node N1. The switch control signal provided by the switch control terminal Em1 is written into the gate electrode of the second transistor T2. At this time, the switch control terminal Em1 provides a high-potential signal, therefore, the second transistor T2 is turned off. The light-emitting component L1 does not emit light at this stage.

It should be noted that in another embodiment, the time data terminal Vdata2 can also provide a high-potential signal at this time, and as a result, the first transistor T1 and the third transistor T3 are both turned off accordingly.

During the tenth stage S10, the light-emitting control terminal Em2 continues to provide a low-potential signal, and the eighth transistor T8 is kept on. The fifth transistor T5 and the third transistor T3 are both kept on. The switch control terminal Em1 provides a low-potential signal, and the second transistor T2 is turned on. The light-emitting component L1 emits light under the driving by the driving current.

At this time, the intensity of the driving current is determined according to the display data signal Vdata1 that has been written into during the second stage S2, whether to emit light is determined by the time data signal Vdata2 that has been written into during the ninth stage S9, and the duration of light emission is equal to the effective pulse width t3 of the switch control signal Em1 during this stage.

It should be noted that in another embodiment, if the time data terminal Vdata2 provides a high-potential signal during the ninth stage S9, the first transistor T1 and the third transistor T3 are both kept off, and the light-emitting component L1 does not emit light during this stage.

According to some embodiments, during the display process, each frame of image is an overlaid image of the images displayed during the fourth stage S4 (i.e. t1 phrase), the seventh stage S7 (i.e. t2 phrase) and the tenth stage S10 (i.e. t3 phrase). Herein, the duration of t1, t2 and t3 can be different from one another. The time data signal Vdata2 that is written into during the third stage S3 is Vdata2-1, the time data signal Vdata2 that is written into during the sixth stage S6 is Vdata2-2, and the data signal Vdata2 that is written into during the ninth stage S9 is Vdata2-3.

The three time data signals Vdata2-1, Vdata2-2 and Vdata2-3 can be configured as a high-potential signal or a low-potential signal based on practical needs (that is, each of them can be configured a logic "1" or logic "0").

When Vdata2-1, Vdata2-2 and Vdata2-3 are respectively "0", "0" and "0", that is, as shown in FIG. 9, the light-emitting component L1 emits light during the t1 phrase, the t2 phrase and the t3 phrase, this frame of image is overlaid by three corresponding images.

In another embodiment, Vdata2-1, Vdata2-2 and Vdata2-3 are respectively "1", "0" and "0", then the light-emitting component L1 only emits light during the t2 phrase and the t3 phrase, and the frame of image is overlaid by two corresponding images.

In yet another embodiment, Vdata2-1, Vdata2-2 and Vdata2-3 are respectively "1", "1" and "0", then the light-emitting component L1 only emits light during the t3 phrase, and this frame of image is overlaid by one corresponding image.

It should be noted that Vdata2-1, Vdata2-2 and Vdata2-3 can be configured according to practical needs, and are not limited to the configuration in the aforementioned embodiments. As such, each frame of image can have multiple overlaying schemes to thereby satisfy the requirements for grayscale, and the contrast of the image can also be improved.

In embodiments of the present disclosure, the time data signal Vdata2-1, Vdata2-2 and Vdata2-3 determine the duration of light emission by the light-emitting component L1, the display data signal Vdata1 determines the intensity of the driving current. These aforementioned parameters together control the display of each frame of image.

In an embodiment as an illustrating example, the Gamma value is set as 2.2, the corresponding relationship among the grayscale, the current density and the light-emitting duration is shown in the following table (i.e. Table 1).

For example, when the desired display grayscale is between 45-255, Vdata 2-1, Vdata2-2 and Vdata2-3 can be respectively set as "1", "1" and "0", so that the light-emitting component L1 only emits light during the t3 phrase, and the duration of light emission is 4000 μs. In addition, the current density can be adjusted to be within the range of 0.2-12 A/cm$^2$. As a result, any grayscale within the range of 45-255 can be displayed.

Similarly, when the desired grayscale is between 7-44, Vdata 2-1, Vdata2-2 and Vdata2-3 can be respectively set as "1", "0" and "1", so that the light-emitting component L1 only emits light during the t2 phrase, and the duration of light emission is 66.66 μs, an the current density can be adjusted to be within the range of 0.2-12 A/cm$^2$. As a result, any grayscale within the range of 7-44 can be displayed.

When the desired display grey scale is 0-6, Vdata2-1, Vdata2-2 and Vdata2-3 can be respectively set as "0", "1" and "1", so that the light-emitting component L1 only emits light during the t1 phrase, and the duration of light emission is 1.11 μs, and the current density can be adjusted to be within the range of 0.2-12 A/cm$^2$. As a result, any grayscale within the range of 0-6 can be displayed.

TABLE 1

Relationship among grayscale, current density and light-emitting duration

| Grayscale | Current Density (A/cm$^2$) | Duration of Light Emission (μs) |
|---|---|---|
| 45-255 | 0.2-12 | t3 = 4000 |
| 7-44 | 0.2-12 | t2 = 66.66 |
| 0-6 | 0.2-12 | t1 = 1.11 |

Under the aforementioned method, the contrast is: (4000×12)/(1.11×0.2)=21621≈210000, which is relatively high and can satisfy normal display requirements. In addition, through the aforementioned method, 256 grayscales of the gamma curve can be achieved, and the range of the current density is 0.2-12 A/cm$^2$.

Within the range of 0.2-12 A/cm$^2$ (i.e. the J1-J2 region of FIG. 1), the light-emitting component L1 (e.g. a Micro LED) will work at the region of stable light-emitting efficiency or higher light-emitting efficiency, when low grayscale is displayed, it indeed does not enter the low-current density region (i.e. non-radiative recombination light-emitting region, for example, below 0.2 A/cm$^2$). As such, it works at the region that has a higher light-emitting efficiency under full grayscale, and the color coordinate shift is thus reduced.

It should be noted that in the embodiments of the present disclosure, there are no limitations to the specific durations of t1, t2 and t3, and there are no limitations to the corresponding relationship between t1, t2 and t3 and the grayscale. In addition, there are no limitations to the number of overlaying images required for each grayscale image, which can be determined according to practical needs and are not limited to the methods in the aforementioned embodiments. Furthermore, because the characteristics of different micro LED are different, the specific corresponding values of the stable light-emitting efficiency regions J1-J2 can be different, and are not limited to the range of 0.2-12 A/cm$^2$, which can be determined according to the specific characteristics of the Micro LED.

In a second aspect, the present disclosure further provides a display panel.

The display panel comprises a plurality of pixel units arranged in an array. Each of the pixel units comprises the pixel circuit based on any one of the embodiments described above. The intensity of the current and the duration of light emission together control the grayscale in the display panel. Thereby, the contrast can be improved, the light-emitting component (for example, Micro LED) can work in the region that has a relatively higher light-emitting efficiency under full grayscale, and the color coordinates shift can be reduced.

Figure 10:
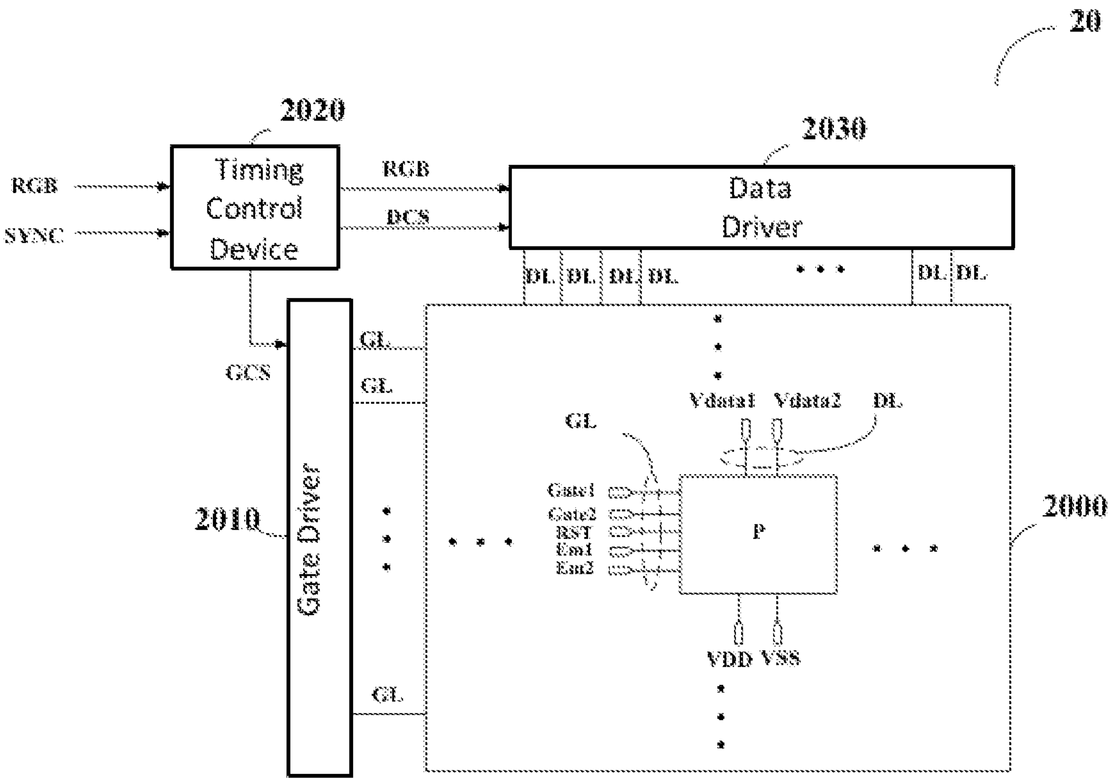
FIG. 10 is a block diagram of a display panel provided by an embodiment of the present disclosure.

FIG. 10 is a block diagram of a display panel provided by an embodiment of the present disclosure. With reference to FIG. 10, the display panel 2000 is configured in a display apparatus 20 and is electrically connected to a gate driver 2010 and a data driver 2030.

The display apparatus 20 further comprises a timing control device 2020. The display panel 2000 comprises a plurality of pixel units P that are positionally defined by a plurality of scan lines GL and a plurality of data lines DL crossing with one another. The gate driver 2010 is configured to drive the plurality of scan lines GL. The data driver 2030 is configured to drive the plurality of data lines DL. The timing control device 2020 is configured to process image data RGB that is inputted from outside the display apparatus 20, to provide the processed image data RGB to the data driver 2030, and to output the scan control signal GCS and the data control signal DCS to the gate driver 2010 and the data driver 2030 to realize a control to the gate driver 2010 and the data driver 2030.

Herein, the display panel 2000 comprises a plurality of pixel units P, and each of the pixel unit P comprises the pixel circuit 10 based on any one of the embodiments described above (for example, the embodiment of the pixel circuit 10 shown in FIG. 7 or FIG. 8).

As shown in FIG. 10, the display panel 2000 further comprises a plurality of scan lines GL and a plurality of data lines DL. Each of the plurality of pixel units P is configured at a region where the scan lines GL and the data lines DL cross with one another. For example, each pixel unit P is connected to five scan lines GL (respectively providing a first scan signal, a second scan signal, a resetting signal, a light-emitting control signal, and a switch control signal), two data lines DL (respectively providing a display data signal and a time data signal), a first voltage line configured to provide the first voltage, and a second voltage line configured to provide the second voltage.

Herein, the first voltage line and the second voltage line can optionally be replaced with a plate-shaped common electrode (for example, common anode or common cathode). It should be noted that only a portion of the plurality of pixel units P, the plurality of scan lines GL and the plurality of data lines DL is illustrated in FIG. 10.

The gate driver 2010 can provide a plurality of ON signals to the plurality of scan lines GL according to the plurality of scan control signals GCS from the timing control device 2020. The plurality of ON signals comprise the first scan signal, the second scan signal, the resetting signal, the light-emitting signal and the switch signal, and so on. These signals are provided to each pixel unit P through the plurality of scan lines GL.

The data driver 2030 can convert the digital image data RGB inputted from the timing control device 2020 into the display data signal and the time data signal according to the plurality of data control signals DCS from the timing control device 2020 with reference to gamma voltage. The data driver 2030 provides the display data signal and time data signal that have been converted to the plurality of data lines DL. The data driver 2030 can further be electrically connected to a plurality of first voltage lines and a plurality of second voltage lines to respectively provide the first voltage and the second voltage.

The timing control device 2020 can process the image data RGB inputted from outside to match the size and resolution of the display panel 2000, and can then provide the processed image data to the data driver 2030. The timing control device 2020 generates a plurality of scan control signals GCS and a plurality of data control signals DCS with the synchronized signal inputted from outside the display apparatus 20 (i.e. from a dot clock DCLK, a data enabling signal DE, a horizontal synchronized signal Hsync, and a vertical synchronized signal Vsync, etc.). The timing control device 2020 respectively provides generated scan control signal GCS and data control signal DCS to the gate driver 2010 and the data driver 2030 to control the gate driver 2010 and the data driver 2030.

Herein, the gate driver 2010 and the data driver 2030 can be implemented as semi-conductor chip. The display apparatus 20 may further comprise other components, such as a signal decoding circuit, a voltage conversion circuit, and so on. These components can be conventional components, and the description thereof will not be repeated herein.

Furthermore, the display panel 2000 disclosed herein can be incorporated into any electronic products or components that have display function, such as electronic books, mobile phones, tablets, televisions, monitors, laptops, digital frames and navigators. Herein, the display panel 2000 can be a Micro LED display panel.

Figure 11:
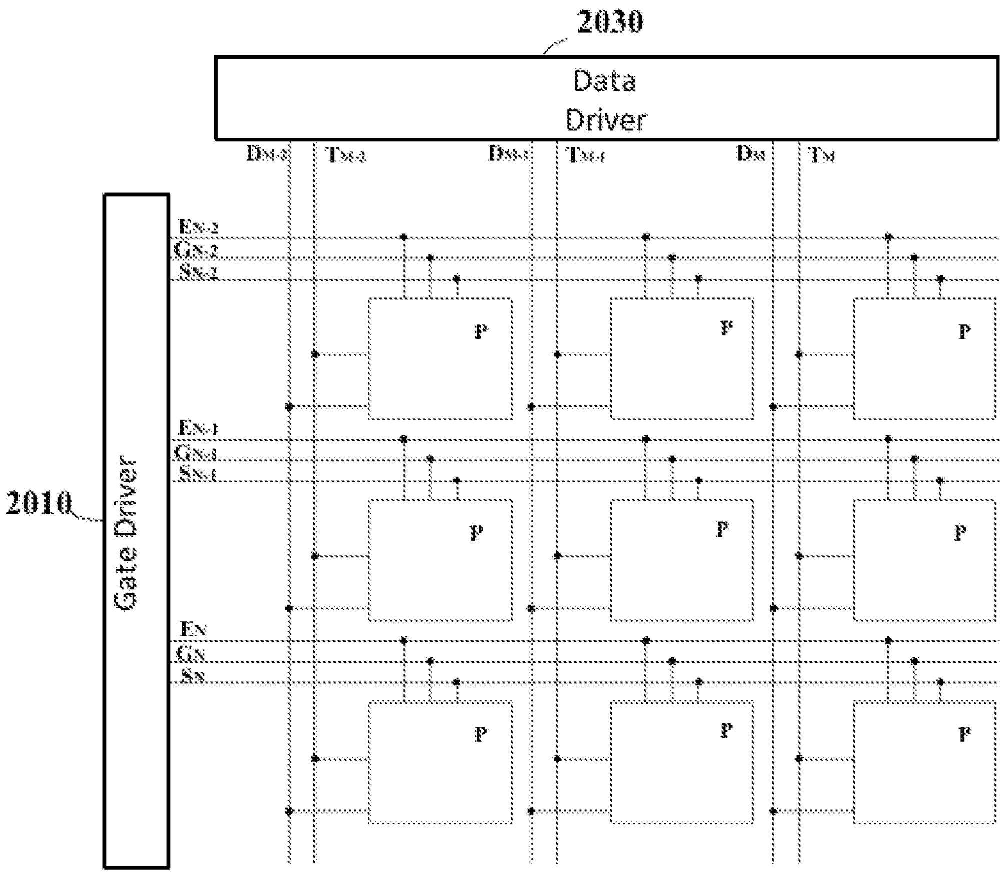
FIG. 11 is a block diagram of a display panel provided by yet another embodiment of the present disclosure.

FIG. 11 is a block diagram of a display panel provided by yet another embodiment of the present disclosure. With reference to FIG. 11, a plurality of pixel units P are arranged in multiple rows and multiple columns, and it is noted that the connection relationship of only a portion of the pixel units is illustrated in the figure.

Herein, the pixel circuit 10 in each of the pixel units P of a same row is electrically connected to a same switch control line (i.e. $E_{N-2}$, $E_{N-1}$, $E_N$, and so on) to thereby receive the same switch control signal Em1 therefrom. The pixel circuit 10 in each of the pixel units P of a same row is further connected to a same first scan line ($G_{N-2}$, $G_{N-1}$, $G_N$, and so on) to thereby receive the same first scan signal Gate1 therefrom. The pixel circuit 10 in each of the pixel units P of a same row is further connected to a same second scan line ($S_{N-2}$, $S_{N-1}$, $S_N$ and so on) to thereby receive the same second scan signal Gate2 therefrom.

Furthermore, the pixel circuit 10 in each of the pixel units P of a same column is connected to the same time data line ($T_{M-2}$, $T_{M-1}$, $T_M$, and so on) thereby to receive the same time data signal Vdata2 therefrom. The pixel circuits 10 in the pixel units P of the same column are further connected to the same display data line ($D_{M-2}$, $D_{M-1}$, $D_M$, and so on) to thereby receive the same display data signal Vdata1 therefrom.

According to some other embodiments, the time data line and the display data line corresponding to each row of pixel units P can be a same signal line, so that the display data signal Vdata1 and the time data signal Vdata2 can be provided at a different time, so as to reduce the number of signal lines.

In a third aspect, the present disclosure further provides a driving method of a pixel circuit based on any one of the embodiments described above.

By means of this driving method, the intensity of the current and the duration of light emission together can control the grey scale, thereby the contrast can be improved, the light-emitting component (for example, Micro LED) can work at a region with a relatively high light-emitting efficiency under full grey scale, and the color coordinates shift can be reduced.

According to one embodiment, the driving method of the pixel circuit 10 comprises:

Inputting the display data signal, the time data signal and the switch control signal, so that the current control circuit 100 can control the current intensity of the driving current flowing through the current control circuit 100, the time control circuit 200 can receive the driving current and control the passage time of the driving current flowing through the time control circuit 200 according to the time data signal and the switch control signal, thereby the light-emitting component 300 is driven by the driving current and emit lights according to the passage time.

In one embodiment, the driving current enables the light-emitting component 300 to work at a region where the light-efficiency is stable, such as the J1-J2 region shown in FIG. 1. As such, the driving method for pixel circuit 10 comprises the following operations:

During the display data writing stage (e.g. the second stage S2), inputting the second scan signal and the display data signal to turn on the display data writing circuit 120 and the driving circuit 110, wherein the display data writing circuit 120 writes the display data signal into the driving circuit 110, and the second storage circuit 130 stores the display data signal.

During the time data writing stage (e.g. the third stage S3 and the fourth stage S4, the sixth stage S6 and the seven stage S7, or the ninth stage S9 and the tenth stage S10), inputting the first scan signal and the time data signal to turn on the time data writing circuit 220. The time data writing circuit 220 writes the time data signal into the switch circuit 210, the first storage circuit 230 stores the time data signal, and the switch circuit 210 controls whether the driving current passes the time control circuit 200 according to the time data signal and the switch control signal, such that the light-emitting component 300 emits light according to whether receiving the driving current and the intensity of the driving current received.

According to some embodiments, the time data writing stage comprises a first time data writing stage, a second time data writing stage, and a third time data writing stage. During the aforementioned stages, the driving method of the pixel circuit 10 substantially comprises the following operations:

During the first time data writing stage (e.g. the third stage S3 and the fourth stage S4), inputting the first scan signal and the first time data signal (e.g., Vdata2-1) to turn on the time data writing circuit 220, then the time data writing circuit 220 writes the first time data signal into the switch circuit 210, the first storage circuit 230 stores the first time data signal, the switch signal 210 controls whether the driving current passes the time control circuit 200 according to the first time data signal and the switch control signal, and the light-emitting component 300 emits light according to whether the driving current is received and the intensity of the driving current;

During the second time data writing stage (e.g. the sixth stage S6 and the seventh stage S7), inputting the first scan signal and the second time data signal (e.g. Vdata2-2) to turn on the time data writing circuit 220, then the time data writing circuit 200 writes the second time data signal into the switch circuit 210, the first storage circuit 230 stores the second time data signal, the switch circuit 210 controls whether the driving current passes the time control circuit 200 according to the second time data signal and the switch control signal, and the light-emitting component 300 emits light according to according to whether the driving current is received and the intensity of the driving current;

During the third time data writing stage (e.g. the ninth stage S9 and the tenth stage S10), inputting the first scan signal and the third time data signal (e.g. Vdata2-3) to turn on the time data writing circuit 220, then the time data writing circuit 220 writes the third time data signal into the switch signal 210, the first storage circuit 230 stores the third time data signal, the switch circuit 210 controls whether the driving current passes the time control circuit 200 according to the third time data signal and the switch control signal, and the light-emitting component 300 emits light according to whether the driving current is received and the intensity of the driving current.

It should be noted that the detailed description of the driving method can reference to the description of the working principles of the pixel circuit 10 and the display panel 2000 in the embodiments of the present disclosure described above, which will not be repeated herein.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation to encompass such modifications and equivalent structures.

The invention claimed is:

1. A pixel circuit, comprising a current control circuit, a time control circuit, and a light-emitting component, electrically coupled to one another in series along a common passage path of a driving current, wherein:

the current control circuit is configured to control an intensity of the driving current according to a display data signal received thereby;

the time control circuit is configured to control a passage time of the driving current according to a time data signal and a switch control signal received thereby;

the light-emitting component is configured to emit a light according to the intensity of the driving current and the passage time of the driving current;

the passage time of the driving current is longer for higher grayscale levels while the intensity of the driving current is within a same range; and the time data signal includes a first, a second, and a third time data signals respectively from a first, a second, and a third time data writing stages such that each frame of image controlled to be displayed by the pixel circuit is overlaid by three corresponding images;

during the first time data writing stage, a first scan signal and the first time data signal are input to turn on a time data writing circuit that writes the first time data signal into a switch circuit, a first storage circuit stores the first time data signal, the switch circuit controls whether the driving current passes the time control circuit according to the first time data signal and a switch control signal, and the light-emitting component emits light according to whether the driving current is received and the intensity of the driving current;

during the second time data writing stage, the first scan signal and the second time data signal are input to turn on the time data writing circuit that writes the second time data signal into the switch circuit, the first storage circuit stores the second time data signal, the switch circuit controls whether the driving current passes the time control circuit according to the second time data signal and the switch control signal, and the light-emitting component emits light according to whether the driving current is received and the intensity of the driving current;

during the third time data writing stage, the first scan signal and the third time data signal are input to turn on the time data writing circuit that writes the third time data signal into the switch circuit, the first storage circuit stores the third time data signal, the switch circuit controls whether the driving current passes the time control circuit according to the third time data signal and the switch control signal, and the light-emitting component emits light according to whether the driving current is received and the intensity of the driving current;

the first time data signal, the second time data signal, and the third time data signal are configured as logic "1" or logic "0" to control selection of duration of light emission by the light-emitting component while the display data signal determines the intensity of the driving current;

the current control circuit, the time control circuit, and the light-emitting component are electrically connected in series between a first voltage terminal and a second voltage terminal along the common passage path of the driving current; wherein the passage time of the driving current includes at least three passage times corresponding respectively to grayscale levels of 0-6, 7-44, and 45-255; and wherein the same range of the intensity of the driving current is 0.2-12 A/$cm^2$;

the time control circuit comprises the switch circuit, the time data writing circuit and the first storage circuit, wherein:

the time data writing circuit is electrically connected to a first control terminal of the switch circuit, and is configured to receive the time data signal and write the time data signal into the first control terminal of the switch circuit under control of the first scan signal;

the switch circuit is configured to control whether the driving current passes through the time control circuit under control of the time data signal and the switch control signal; and the first storage circuit is electrically connected to the first control terminal, and is configured to store the time data signal written by the time data writing circuit;

the switch circuit comprises a first transistor, a second transistor and a third transistor, wherein:

a gate electrode of the first transistor is configured as the first control terminal of the switch circuit, a first electrode of the first transistor is electrically connected to a gate electrode of the second transistor, a second electrode of the first transistor is configured to receive the switch control signal;

a first electrode of the second transistor is electrically connected to the current control circuit, a second electrode of the second transistor is electrically connected to a first electrode of the third transistor; and a gate electrode of the third transistor is electrically connected to the gate electrode of the first transistor, a second electrode of the third transistor is electrically connected to the light-emitting component;

the time data writing circuit comprises a fourth transistor, wherein:

a gate electrode of the fourth transistor is configured to receive the first scan signal;

a first electrode of the fourth transistor is configured to receive the time data signal; and a second electrode of the fourth transistor is electrically connected to the gate electrode of the first transistor; and the first storage circuit comprises a first capacitor, wherein:

a first electrode thereof is electrically connected to the gate electrode of the first transistor; and a second electrode thereof is electrically connected to a third voltage terminal to receive a third voltage therefrom.

2. The pixel circuit of claim 1, wherein the third voltage terminal is a ground terminal, the second voltage terminal, or a low-voltage terminal independent from the second voltage terminal.

3. The pixel circuit of claim 1, wherein the current control circuit comprises a driving circuit, a display data writing circuit and a second storage circuit, wherein:

the driving circuit comprises a second control terminal, a first terminal and a second terminal, and it is configured to control the intensity of the driving current;

the display data writing circuit is electrically connected to at least one of the first terminal or the second control terminal of the driving circuit, and is configured to write the display data signal into the at least one of the first terminal or the control terminal of the driving circuit under control of a second scan signal; and the second storage circuit is electrically connected to the second control terminal of the driving circuit, and is configured to store the display data signal written by the display data writing circuit.

4. The pixel circuit of claim 3, wherein the display data writing circuit is electrically connected to the first terminal of the driving circuit, and is configured to write the display data signal into the first terminal of the driving circuit under control of the second scan signal.

5. The pixel circuit of claim 3, wherein the current control circuit further comprises a compensation circuit, a light-emitting control circuit and a resetting circuit, wherein:

the compensation circuit is electrically connected to the second control terminal and the second terminal of the driving circuit, and is configured to compensate the driving circuit according to the second scan signal and the display data signal written into the first terminal of the driving circuit;

the light-emitting control circuit is electrically connected to the first voltage terminal and the first terminal of the driving circuit, and is configured to apply a first voltage of the first voltage terminal to the first terminal of the driving circuit based on a light-emitting control signal;

the resetting circuit is electrically connected to the second control terminal of the driving circuit, and is configured to apply a resetting voltage to the control terminal of the driving circuit based on a resetting signal.

6. The pixel circuit of claim 5, wherein the compensation circuit comprises a seventh transistor, wherein:

a gate electrode of the seventh transistor is configured to receive the second scan signal;

a first electrode of the seventh transistor is electrically connected to the control terminal of the driving circuit; and a second electrode of the seventh transistor is electrically connected to the second terminal of the driving circuit.

7. The pixel circuit of claim 5, wherein the light-emitting control circuit comprises an eighth transistor, wherein:

a gate electrode of the eighth transistor is configured to receive the light-emitting control signal;

a first electrode of the eighth transistor is electrically connected to the first voltage terminal; and a second electrode of the eighth transistor is electrically connected to the first terminal of the driving circuit.

8. The pixel circuit of claim 5, wherein the resetting circuit comprises a ninth transistor, wherein:

a gate electrode of the ninth transistor is configured to receive the resetting signal;

a first electrode of the ninth transistor is electrically connected to the second control terminal of the driving circuit; and a second electrode of the ninth transistor is electrically connected to a resetting voltage terminal to receive a resetting voltage therefrom.

9. The pixel circuit of claim 3, wherein the driving circuit comprises a fifth transistor, wherein:

a gate electrode of the fifth transistor is configured as the second control terminal of the driving circuit;

a first electrode of the fifth transistor is configured as the first terminal of the driving circuit; and a second electrode of the fifth transistor is configured as the second terminal of the driving circuit and is electrically connected to the time control circuit.

10. The pixel circuit of claim 3, wherein the display data writing circuit comprises a sixth transistor, wherein:

a gate electrode of the sixth transistor is configured to receive the second scan signal;

a first electrode of the sixth transistor is configured to receive the display data signal; and a second electrode of the sixth transistor is electrically connected to at least one of the first terminal or the second control terminal or the driving circuit.

11. The pixel circuit of claim 3, wherein the second storage circuit comprises a second capacitor, wherein:

a first electrode of the second capacitor is electrically connected to the second control terminal of the driving circuit; and a second electrode of the second capacitor is electrically connected to a fourth voltage terminal to receive a fourth voltage therefrom.

12. The pixel circuit of claim 1, wherein the light-emitting component comprises a light-emitting diode.

13. A display panel, comprising a plurality of pixel units arranged in an array having rows and columns, wherein:

each of the plurality of pixel units comprises a pixel circuit according claim 1, wherein:

the plurality of pixel units in a same row are electrically connected to at least one of a same switch control line, a same first scan line, or a same second scan line; or the plurality of pixel units in a same column are electrically connected to a same time data line or a same display data line.

14. A method for driving a pixel circuit, wherein the pixel circuit comprises a current control circuit, a time control circuit, and a light-emitting component, electrically coupled to one another in series along a common passage path of a driving current, wherein the current control circuit is configured to control an intensity of the driving current according to a display data signal received thereby, the time control circuit is configured to control a passage time of the driving current according to a time data signal and a switch control signal received thereby, and the light-emitting component is configured to emit a light according to the intensity of the driving current and the passage time of the driving current, the method comprising:

providing the display data signal to the current control circuit, and the time data signal and the switch control signal to the time control circuit, wherein the passage time of the driving current is longer for higher grayscale levels while the intensity of the driving current is within a same range; and wherein the time data signal includes a first, a second, and a third time data signals respectively from a first, a second, and a third time data writing stages such that each frame of image controlled to be displayed by the pixel circuit is overlaid by three corresponding images;

wherein during the first time data writing stage, a first scan signal and the first time data signal are input to turn on a time data writing circuit that writes the first time data signal into a switch circuit, a first storage circuit stores the first time data signal, the switch circuit controls whether the driving current passes the time control circuit according to the first time data signal and a switch control signal, and the light-emitting component emits light according to whether the driving current is received and the intensity of the driving current;

during the second time data writing stage, the first scan signal and the second time data signal are input to turn on the time data writing circuit that writes the second time data signal into the switch circuit, the first storage circuit stores the second time data signal, the switch circuit controls whether the driving current passes the time control circuit according to the second time data signal and the switch control signal, and the light-emitting component emits light according to whether the driving current is received and the intensity of the driving current; and during the third time data writing stage, the first scan signal and the third time data signal are input to turn on the time data writing circuit that writes the third time data signal into the switch circuit, the first storage circuit stores the third time data signal, the switch circuit controls whether the driving current passes the time control circuit according to the third time data signal and the switch control signal, and the light-emitting component emits light according to whether the driving current is received and the intensity of the driving current;

the first time data signal, the second time data signal, and the third time data signal are configured as logic "1" or logic "0" to control selection of duration of light emission by the light-emitting component while the display data signal determines the intensity of the driving current;

the current control circuit, the time control circuit, and the light-emitting component are electrically connected in series between a first voltage terminal and a second voltage terminal along the common passage path of the driving current; wherein the passage time of the driving current includes at least three passage times corresponding respectively to grayscale levels of 0-6, 7-44, and 45-255; and wherein the same range of the intensity of the driving current is 0.2-12 $A/cm^2$;

the time control circuit comprises the switch circuit, the time data writing circuit and the first storage circuit, wherein:

the time data writing circuit is electrically connected to a first control terminal of the switch circuit, and is configured to receive the time data signal and write the time data signal into the first control terminal of the switch circuit under control of the first scan signal;

the switch circuit is configured to control whether the driving current passes through the time control circuit under control of the time data signal and the switch control signal; and the first storage circuit is electrically connected to the first control terminal, and is configured to store the time data signal written by the time data writing circuit;

the switch circuit comprises a first transistor, a second transistor and a third transistor, wherein:

a gate electrode of the first transistor is configured as the first control terminal of the switch circuit, a first electrode of the first transistor is electrically connected to a gate electrode of the second transistor, a second electrode of the first transistor is configured to receive the switch control signal;

a first electrode of the second transistor is electrically connected to the current control circuit, a second electrode of the second transistor is electrically connected to a first electrode of the third transistor; and a gate electrode of the third transistor is electrically connected to the gate electrode of the first transistor, a second electrode of the third transistor is electrically connected to the light-emitting component;

the time data writing circuit comprises a fourth transistor, wherein:

a gate electrode of the fourth transistor is configured to receive the first scan signal;

a first electrode of the fourth transistor is configured to receive the time data signal; and a second electrode of the fourth transistor is electrically connected to the gate electrode of the first transistor; and the first storage circuit comprises a first capacitor, wherein:

a first electrode thereof is electrically connected to the gate electrode of the first transistor; and a second electrode thereof is electrically connected to a third voltage terminal to receive a third voltage therefrom.

15. The method of claim 14, wherein the current control circuit comprises a driving circuit, a display data writing circuit and a second storage circuit, wherein the driving circuit comprises a second control terminal, a first terminal and a second terminal, and is configured to control the intensity of the driving current; the display data writing circuit is electrically connected to at least one of the first terminal or the second control terminal of the driving circuit, and is configured to write the display data signal into the at least one of the first terminal or the control terminal of the driving circuit under control of a second scan signal; and the second storage circuit is electrically connected to the second control terminal of the driving circuit, and is configured to store the display data signal written by the display data writing circuit, wherein the providing the display data signal to the current control circuit, and the time data signal and the switch control signal to the time control circuit comprising:

a display data writing stage, comprising: providing the second scan signal and the display data signal to turn on the display data writing circuit and the driving circuit, such that the display data writing circuit writes the display data signal into the driving circuit, and the second storage circuit stores the display data signal.

* * * * *